United States Patent
Yoo

(10) Patent No.: US 8,799,162 B2
(45) Date of Patent: Aug. 5, 2014

(54) PASS-THROUGH PAYMENT SYSTEM

(75) Inventor: David Yoo, San Mateo, CA (US)

(73) Assignee: Boku, Inc., San Francisco, CA (US)

( * ) Notice: Subject to any disclaimer, the term of this patent is extended or adjusted under 35 U.S.C. 154(b) by 0 days.

(21) Appl. No.: 13/334,704

(22) Filed: Dec. 22, 2011

(65) Prior Publication Data

US 2013/0138562 A1 May 30, 2013

Related U.S. Application Data

(60) Provisional application No. 61/565,295, filed on Nov. 30, 2011.

(51) Int. Cl.
*G06Q 40/00* (2012.01)

(52) U.S. Cl.
USPC ............... 705/44; 705/16; 705/26.3; 705/39

(58) Field of Classification Search
USPC .................................. 705/16, 26.3, 39, 44
See application file for complete search history.

(56) References Cited

U.S. PATENT DOCUMENTS

| | | | |
|---|---|---|---|
| 6,332,126 B1 | 12/2001 | Peirce et al. | |
| 6,535,855 B1 | 3/2003 | Cahill et al. | |
| 6,685,088 B1 | 2/2004 | Royer et al. | |
| 7,426,492 B1 | 9/2008 | Bishop et al. | |
| 7,783,532 B2 | 8/2010 | Hsu et al. | |
| 8,041,634 B2 | 10/2011 | Eastley et al. | |
| 8,065,185 B2 | 11/2011 | Foladare et al. | |
| 8,132,723 B2 | 3/2012 | Hogg et al. | |
| 8,190,526 B2 * | 5/2012 | Jung et al. ................. | 705/44 |
| 8,245,044 B2 | 8/2012 | Kang | |
| 2002/0174063 A1 | 11/2002 | Major | |
| 2003/0028481 A1 | 2/2003 | Flitcroft et al. | |
| 2004/0117250 A1 * | 6/2004 | Lubow et al. ............... | 705/14 |
| 2004/0128197 A1 | 7/2004 | Bam et al. | |
| 2005/0086169 A1 * | 4/2005 | Wells et al. ................. | 705/44 |
| 2005/0105735 A1 | 5/2005 | Iino et al. | |
| 2005/0105745 A1 | 5/2005 | Bowen et al. | |
| 2005/0121512 A1 | 6/2005 | Wankmueller | |
| 2005/0187873 A1 | 8/2005 | Labrou et al. | |
| 2006/0253335 A1 | 11/2006 | Keena et al. | |
| 2007/0011252 A1 | 1/2007 | Taylor | |
| 2007/0094067 A1 | 4/2007 | Kumar et al. | |

(Continued)

OTHER PUBLICATIONS

Phillips, D. J. (1998). Digital cash and the surveillance society: Negotiating identification in new consumer payment systems. (Order No. 9829972, University of Pennsylvania). ProQuest Dissertations and Theses, , 289-289 p. Retrieved from http://search.proquest.com/docview/304453540?accountid=14753. (304453540).*

(Continued)

*Primary Examiner* — Muriel Tinkler

(74) *Attorney, Agent, or Firm* — Stephen M. De Klerk

(57) ABSTRACT

The invention provides a computer system and method for managing electronic transactions. A plurality of consumer accounts stored in the data store. A payment source storing module stores a plurality of payment sources. A payment source selector is set upon receiving a payment source selection to indicate a selected one of the payment sources. A communication and routing module receives a charge request over the network interface device. A transaction processing system determines a payment source selected with the payment source selector, and processes the charge request based on the payment source selected by the payment source selector.

18 Claims, 41 Drawing Sheets

(56) References Cited

U.S. PATENT DOCUMENTS

| | | |
|---|---|---|
| 2007/0198432 A1 | 8/2007 | Pitroda et al. |
| 2008/0010190 A1 | 1/2008 | Rackley III et al. |
| 2008/0010191 A1 | 1/2008 | Rackley III et al. |
| 2008/0097851 A1 | 4/2008 | Bemmel et al. |
| 2008/0156873 A1 | 7/2008 | Wilhelm et al. |
| 2008/0189210 A1* | 8/2008 | Sawhney .................. 705/44 |
| 2008/0208762 A1 | 8/2008 | Arthur et al. |
| 2009/0030787 A1 | 1/2009 | Pon |
| 2009/0070205 A1 | 3/2009 | Altberg et al. |
| 2009/0099965 A1 | 4/2009 | Grant, IV |
| 2009/0104888 A1 | 4/2009 | Cox |
| 2009/0138302 A1 | 5/2009 | Breznik et al. |
| 2010/0106592 A1 | 4/2010 | Brown |
| 2010/0161433 A1 | 6/2010 | White |
| 2010/0185546 A1 | 7/2010 | Pollard |
| 2010/0191646 A1 | 7/2010 | Smith |
| 2010/0250359 A1 | 9/2010 | Gillenson et al. |
| 2010/0312703 A1 | 12/2010 | Kulpati et al. |
| 2011/0022475 A1 | 1/2011 | Inbar et al. |
| 2011/0035302 A1 | 2/2011 | Martell et al. |
| 2011/0045896 A1 | 2/2011 | Sak et al. |
| 2011/0047045 A1 | 2/2011 | Brody et al. |
| 2011/0093327 A1 | 4/2011 | Fordyce, III et al. |
| 2011/0137740 A1 | 6/2011 | Bhattacharya et al. |
| 2011/0161142 A1 | 6/2011 | Dunn et al. |
| 2011/0217994 A1 | 9/2011 | Hirson et al. |
| 2011/0237232 A1 | 9/2011 | Hirson et al. |
| 2011/0251892 A1 | 10/2011 | Laracey |
| 2011/0270813 A1 | 11/2011 | Cok et al. |
| 2011/0289001 A1 | 11/2011 | Bishop et al. |
| 2012/0173413 A1 | 7/2012 | Yoo |
| 2012/0215609 A1 | 8/2012 | Yoo et al. |
| 2012/0215619 A1 | 8/2012 | Yoo |
| 2012/0259686 A1 | 10/2012 | Yurow |
| 2013/0006742 A1 | 1/2013 | Richard |

OTHER PUBLICATIONS

Chandranmenon, G. P. (1999). Reducing internet latency using precomputed hints. (Order No. 9945247, Washington University). ProQuest Dissertations and Theses, , 189-189 p. Retrieved from http://search.proquest.com/docview/30453360?accountid=14753. (304533360).*

McLaughlin, M. J. (1999). Achieving a multidatabase object transaction service through an asynchronous socket. (Order No. 9953695, Colorado Technical University). ProQuest Dissertations and Theses, , 203-203 p. Retrieved from http://search.proquest.com/docview/304580173?accountid=14753. (304580173).*

International Application No. PCT/US2012/024912, International Filing Date: Feb. 13, 2012, International Search Report and Written Opinion mailed on 6/8/212.

International Application No. PCT/US11/66824, International Filing Date: Dec. 22, 2011, International Search Report and Written Opinion, mailed on Apr. 19, 2012.

International Preliminary Report on Patentability, International Application No. PCT/US11/66824, filed on Dec. 22, 2011, Mar. 8, 2013.

International Preliminary Report on Patentability, International Application No. PCT/US2012/024911 filed on Feb. 13, 2012, Mar. 8, 2013.

International Search Report and Written Opinion, International Patent Application No. PCT/US2012/068705 filed on Dec. 10, 2012, 7 pages.

International Search Report and Written Opinion, International Application No. PCT/US2012/069176, filed Dec. 12, 2012, Feb. 20, 2013.

International Search Report and Written Opinion mailed on Feb. 19, 2013, International Application No. PCT/US12/67390 filed on Nov. 30, 2012.

McKitterick, ""A Web Services Framework for Mobile Payment Services." [online]", Published Sep. 2003. [retrieved on Jan. 28, 2013] Retrieved from the Internet BURL: https://www.cs.tcd.ie/publications/tech-reports/reports.03/TCD-CS-2003-59.pdf>, entire document, especially Abstract; sections 3.4.2-3.4.3, 5.3.1-5.3.3, 5.4.1, Sep. 2003.

International PCT Application No. PCT/US12/24912, filed on Feb. 13, 2012, International Preliminary Report on Patentability, May 13, 2013.

International Search Report and Written Opinion, International PCT Application No. PCT/US13/32861, International Filing Date of Mar. 18, 2013, mailing date May 31, 2013.

"International Preliminary Report on Patentability", International PCT Application No. PCT/US12/69176, International Filing Date of Dec. 12, 2012, Dec. 9, 2013.

"Written Opinion of the International Preliminary Examining Authority", International Application No. PCT/US12/67390, International Filing Date Nov. 30, 2012, Nov. 8, 2013.

Cook, Alyson, "Retail vouchers A-Z", Incentive Business, Oct. 2003.

Singer, Steve, "Vouchers: More data, fewer dollars", Pharmaceutical Executive, Nov. 2001.

* cited by examiner

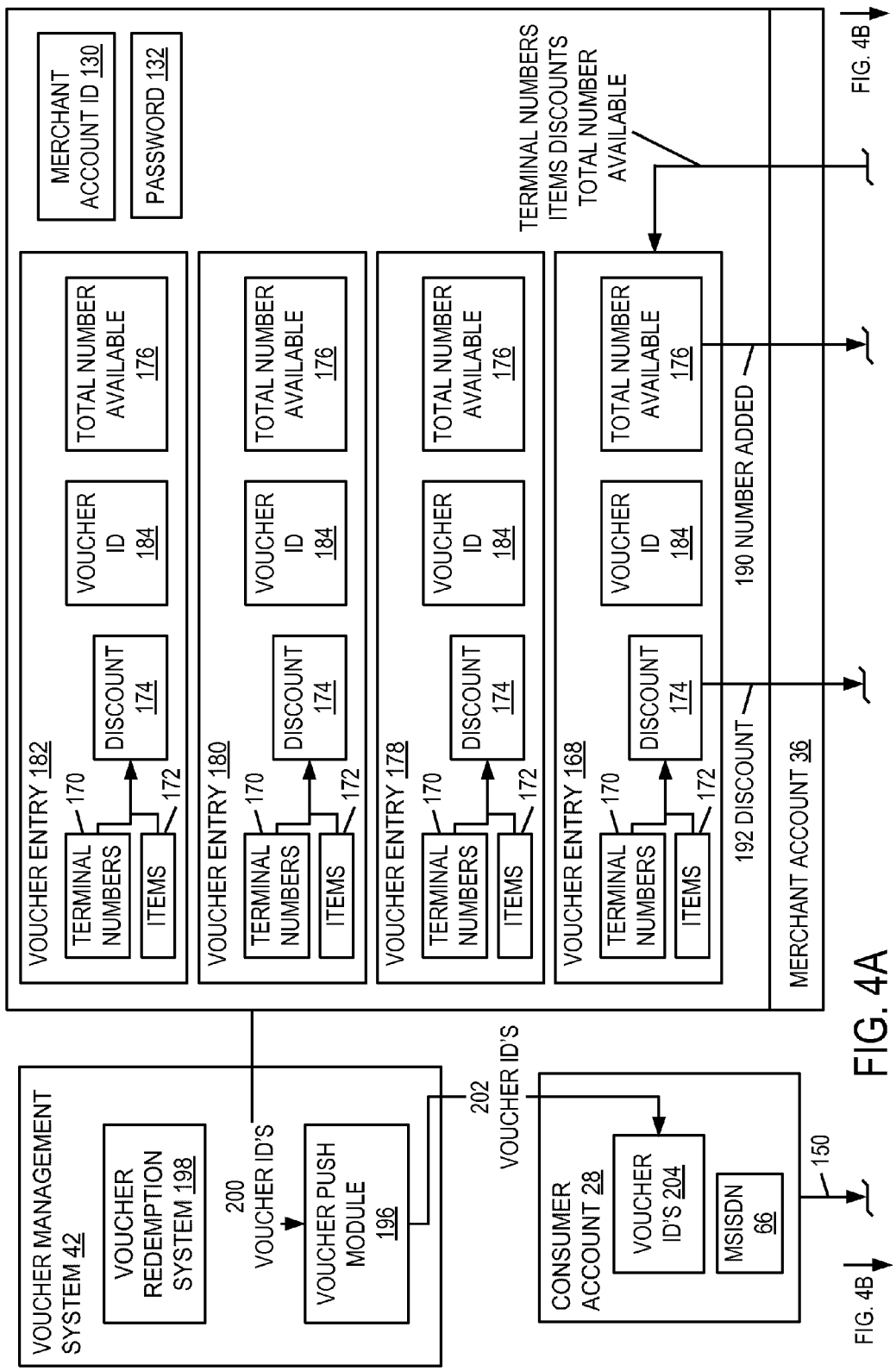

Merchant Campaigns powered by •boku

[Campaigns] [Transactions]

Welcome back Skell!
Need Help?   Log out

DETAILS > MESSAGE > TARGET > PREVIEW > SHARING > SUCCESS

Select your sharing options

| | | | |
|---|---|---|---|
| Budget | $2,000.00 | Start Date | 11/15/2011 |
| Offers per User | 1 | End Date | 11/30/2011 |
| Amount Per Offer | $2.00 | | |
| Share with Others | Yes | Shares Per User | 10 |
| Share Count | 400 | | |

Need Help?   BOKU Corporate Site   Privacy Policy   Terms of Use   Contact Us   |   ©2011 BOKU, Inc.

PASS-THROUGH PAYMENT SYSTEM

CROSS-REFERENCE TO RELATED APPLICATIONS

This nonprovisional application claims priority from U.S. Provisional Patent Application No. 61/565,295, filed on Nov. 30, 2011, which is incorporated herein by reference.

BACKGROUND OF THE INVENTION

1). Field of the Invention

This invention relates generally to a transactions network and to a method and system for managing electronic transactions.

2). Discussion of Related Art

A customer who visits a store often uses a point-of-sale instrument such as a bank card or a credit card to pay for an item or items that are being purchased. The point-of-sale instrument communicates with a point-of-sale device such as a credit card reader. The point-of-sale device forms part of a point-of-sale network that communicates a charge request to a merchant acquirer computer system and the merchant acquirer computer system routes the charge to an issuer computer system forming part of the point-of-sale network. The issuer computer system may for example include a credit card account to which an amount recorded on the point-of-sale device can be charged if sufficient funds or credit are available. The issuer computer system then returns a confirmation through the merchant acquirer computer system to the point-of-sale device that the transaction is good, whereafter an operator of the point-of-sale device will allow the customer to leave the store with the goods that are being purchased.

Electronic transactions can be conducted in a similar manner. In the case of electronic transactions, a user can enter details of a point-of-sale instrument into an interface. Once the details are received, a charge request can be transmitted to a merchant acquirer computer system, and then be processed in a similar manner.

SUMMARY OF THE INVENTION

The invention provides a computer system for managing electronic transactions, including a server computer system including a processor, a computer-readable medium connected to the processor, a network interface device connected to the processor and a set of instructions on the computer-readable medium, the set of instructions being executable by the processor and including a data store, a plurality of consumer accounts stored in the data store, each consumer account having a first consumer account identifier, a payment source storing module storing a plurality of payment sources associated with the respective consumer account having the respective consumer account identifier, a payment source selector set upon receiving a payment source selection over the network interface device to indicate a selected one of the payment sources, the payment source selector indicating a selected one of the payment sources based on the payment source selection, a communication and routing module that receives a charge request over the network interface device, the charge request including an amount and a second consumer account identifier and identifies a selected one of the consumer accounts by associating one of the first consumer account identifiers with the second consumer account identifier and a transaction processing system determining a payment source selected with the payment source selector, wherein the charge request is processed based on the payment source selected by the payment source selector.

The invention further provides a computer-based method of managing electronic transactions including storing, with a processor, a plurality of consumer accounts in a data store, each consumer account having a first consumer account identifier, storing, with the processor, a plurality of payment sources associated with the respective consumer account having the respective consumer account identifier, receiving, with the processor, a payment source selection over the network interface device to indicate a selected one of the payment sources, setting, with the processor, a payment source selector to indicate a selected one of the payment sources based on the payment source selection, receiving, with the processor, a charge request over the network interface device, the charge request including an amount and a second consumer account identifier, identifying, with the processor, a selected one of the consumer accounts by associating one of the first consumer account identifiers with the second consumer account identifier, determining, with the processor, a payment source selected with the payment source selector, and processing, with the processor, the charge request based on the payment source selected by the payment source selector.

BRIEF DESCRIPTION OF THE DRAWINGS

The invention is described by way of example with reference to the accompanying drawings, wherein:

FIG. 3A is a screenshot that is displayed within a browser of the consumer computer system after logging into the consumer account and showing details of the consumer account;

FIG. 3B is a view similar to FIG. 3A for the consumer to manage funding sources;

FIG. 5B is a view similar to FIG. 5A permitting the merchant to enter initial details of a voucher, including a discount amount and start and end dates;

FIG. 5C is a view similar to FIG. 5B where the merchant can upload a voucher image;

FIG. 12 is a view similar to FIG. 5E where the merchant selects sharing offers of the offer;

DETAILED DESCRIPTION OF THE INVENTION

Figure 1:
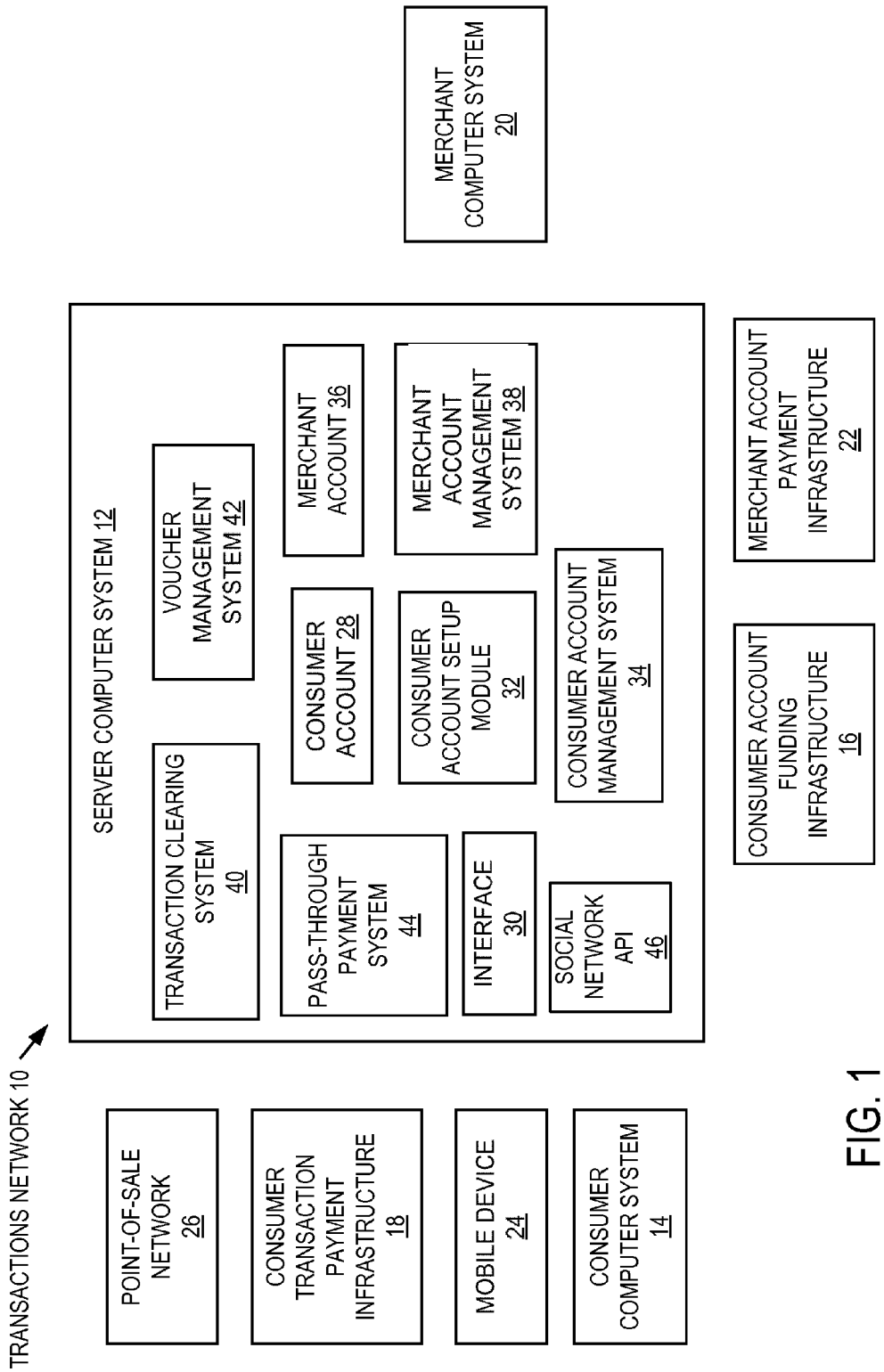
FIG. 1 is a block diagram of a transactions network according to an embodiment of the invention.

FIG. 1 of the accompanying drawings illustrates a transactions network 10, according to an embodiment of the invention, including a server computer system 12, a consumer computer system 14, a consumer account funding infrastructure 16, a consumer transaction payment infrastructure 18, a merchant computer system 20, a merchant account payment infrastructure 22, a mobile device 24, and a point-of-sale network 26.

The server computer system 12 includes a plurality of consumer accounts (only one consumer account 28 shown), an interface 30 for establishing a consumer account 28, a consumer account setup module 32, a consumer account management system 34, a plurality of merchant accounts (only one merchant account 36 shown), a merchant account management system 38, a transaction clearing system 40, a voucher management system 42, a pass-through payment system 44, and a social network application programmable interface (API) 46.

Figure 2A:
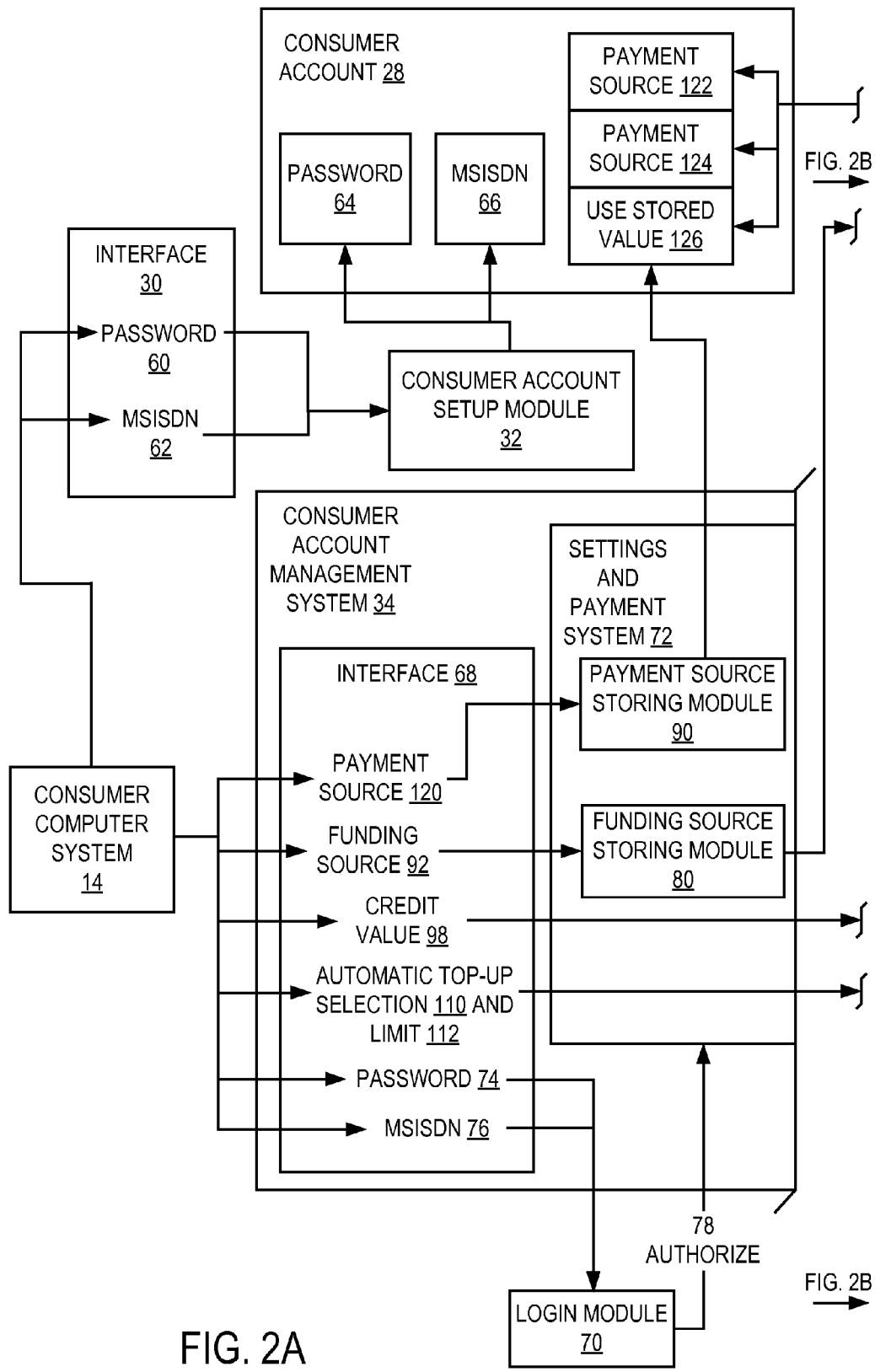
FIGS. 2A and B are a block diagram illustrating interaction between a consumer computer system and a consumer account setup module to establish a consumer account, interaction between the consumer computer system and a settings and payment system to store a funding source, transfer funds from a consumer account funding infrastructure to a stored value, set automatic top-up of the stored value, and select payment sources for pass-through payment.

The consumer computer system 14 is connected over the Internet to the server computer system 12 and can download the interface 30. As shown in FIG. 2A, a consumer at the computer system 14 establishes a consumer account 28 by providing a password 60 and a phone number, also referred to herein as a "Mobile Subscriber Integrated Services Digital Network Number" or "MSISDN" 62 through the interface 30 to the consumer account setup module 32. The consumer account setup module 32 then establishes one consumer account 28 with a password 64 corresponding to the password 60 and a MSISDN 66 corresponding to the MSISDN 62. The MSISDN 66 serves as a consumer account identifier for the respective consumer account 28. Each consumer account 28 will therefore have a different MSISDN 66.

The consumer account management system 34 includes an interface 68, a login module 70, and a settings and payment system 72. A consumer at the consumer computer system 14 can download the interface 68 onto the consumer computer system 14. The consumer at the consumer computer system 14 can then enter a password 74 and a MSISDN 76 into the interface 68. The password 74 and the MSISDN 76 are transmitted from the consumer computer system 14 to the server computer system 12 and are received by the login module 70. The login module 70 then compares the password 74 with the password 64 of the consumer account 28 and compares the MSISDN 76 with the MSISDN 66 of the consumer account 28. Upon a favorable comparison of the passwords 74 and 64 and the MSISDNs 76 and 66, the login module 70 at 78 authorizes access to the functionality of the settings and payment system 72 for the consumer account 28 having the respective MSISDN 66 corresponding to the MSISDN 76. The authorization 78 is thus not provided to the consumer computer system 14 upon an unfavorable login through the login module 70.

Referring to FIGS. 2A and B in combination, the settings and payment system 72 includes a funding source storing module 80, a funding module 82, an account lookup and credit module 84, an automatic top-up settings module 86, an automatic top-up execution module 88, and a payment source storing module 90.

A consumer at the consumer computer system 14 can enter a funding source 92 through the interface 68 into the settings and payment system 72. The funding source storing module 80 then stores the funding source 92 as a funding source 94 within the consumer account 28 having the appropriate MSISDN 66. The consumer account 28 also has a stored value 96 that is initially set at $0. Should the consumer at the consumer computer system 14 wish to increase the stored value 96, the consumer enters a credit value 98 through the interface 68 into the settings and payment system 72. The funding module 82 receives the credit value 98. The credit value 98 may for example be for $40. At 100, the funding module 82 retrieves the funding source 94 and the MSISDN 66 from the consumer account 28. At 102, the funding module 82 communicates with the consumer account funding infrastructure 16 by transmitting a funding request. The consumer account funding infrastructure 16 may for example include a bank account number. The funding source 92 includes routing information for the bank account number. At 102, the funding module 82 thus uses the routing information of the funding source 92 to reach the respective bank account number in the consumer account funding infrastructure 16. At 102, the respective credit value 98, in the present example $40, is also transmitted to the consumer account funding infrastructure 16. The signal transmitted at 102 also includes an IP address of the server computer system 12 for purposes of return communication.

The consumer account infrastructure 16 then makes a determination whether sufficient funds are available within the consumer account funding infrastructure 16 to allow for a transfer of the credit value 98. At 104, the consumer account funding infrastructure 16 utilizes the IP address received at 102 to transmit a top-up confirmation to the funding module 82. A top-up confirmation is only transmitted if sufficient funds are available within the consumer account funding infrastructure 16 to cover the credit value 98. If insufficient funds are available within the consumer account funding infrastructure 16, then no top-up confirmation will be transmitted at 104 and a decline signal will instead be transmitted to the funding module 82.

If a decline signal is received by the funding module 82 from the consumer account funding infrastructure 16, the funding module 82 will update the interface 68 to indicate that the stored value 96 will not be increased. If the top-up confirmation 104 is received by the funding module 82, the funding module at 106 then transmits the MSISDN 66 received at 100 and the credit value 98 to the account lookup and credit module 84. The account lookup and credit module 84 then, at 108, utilizes the MSISDN 66 to access the respective consumer account 28 and increases the stored value 96 by the credit value 98. In the present example the stored value 96 is thus increased from $0 to $40.

The consumer at the consumer computer system 14 may also enter an automatic top-up selection 110 and limit 112 through the interface 68 into the settings and payment system 72. The automatic top-up settings module 86 then stores the automatic top-up selection 110 as an automatic top-up selector 114 in the consumer account 28 and stores the automatic top-up limit 112 as an automatic top-up limit 116 in the consumer account 28. The automatic top-up selector 114 indicates whether an automatic top-up should be performed, or not, based on the automatic top-up selection 110. The automatic top-up limit 116 is a value below which the consumer does not want the stored value 96 to go.

The automatic top-up execution module 88 periodically, e.g. daily, reads the automatic top-up selector 114 and the automatic top-up limit 116. The automatic top-up execution module 88 only executes the funding module 82 if the automatic top-up selector 114 is set to an "on" status for automatic top-up and the stored value 96 is below the automatic top-up limit 116. The automatic top-up execution module 88 therefore does not execute the funding module 82 if either the automatic top-up selector 114 is set to "off" indicating no automatic top-up, or if the automatic top-up limit 116 is above the stored value 96.

When the automatic top-up execution module 88 executes the funding module 82, the automatic top-up execution module 88 transmits a credit value to the funding module 82 and the funding module 82 then transmits the credit value in the funding request 102 to the consumer account funding infrastructure 16. The credit value may for example be the difference between the stored value 96 and the automatic top-up limit 116. Upon a favorable top-up confirmation 104, the funding module 82 then automatically transmits the MSISDN 66 and a credit value at 106 to the account lookup and credit module 84 for increasing the stored value 96 by the credit value. The stored value 96 is thus automatically updated based on the automatic top-up selector 114 and the automatic top-up limit 116.

The consumer at the consumer computer system 14 can also enter a payment source 120 through the interface 68 into the settings and payment system 72. The payment source storing module 90 then stores the payment source 120 as a payment source 122 in the consumer account 28. The process may be repeated so that the consumer at the consumer computer system 14 can enter an additional payment source that is stored by the payment source storing module 90 as a payment source 124 in the consumer account 28. In addition, the consumer account 28 has a setting for use stored value 126. The consumer account 28 also has a payment source selector 128. The payment source selector 128 is set to point to only one of the payment sources 122 or 124, or to the setting for use stored value 126.

Figure 3A:
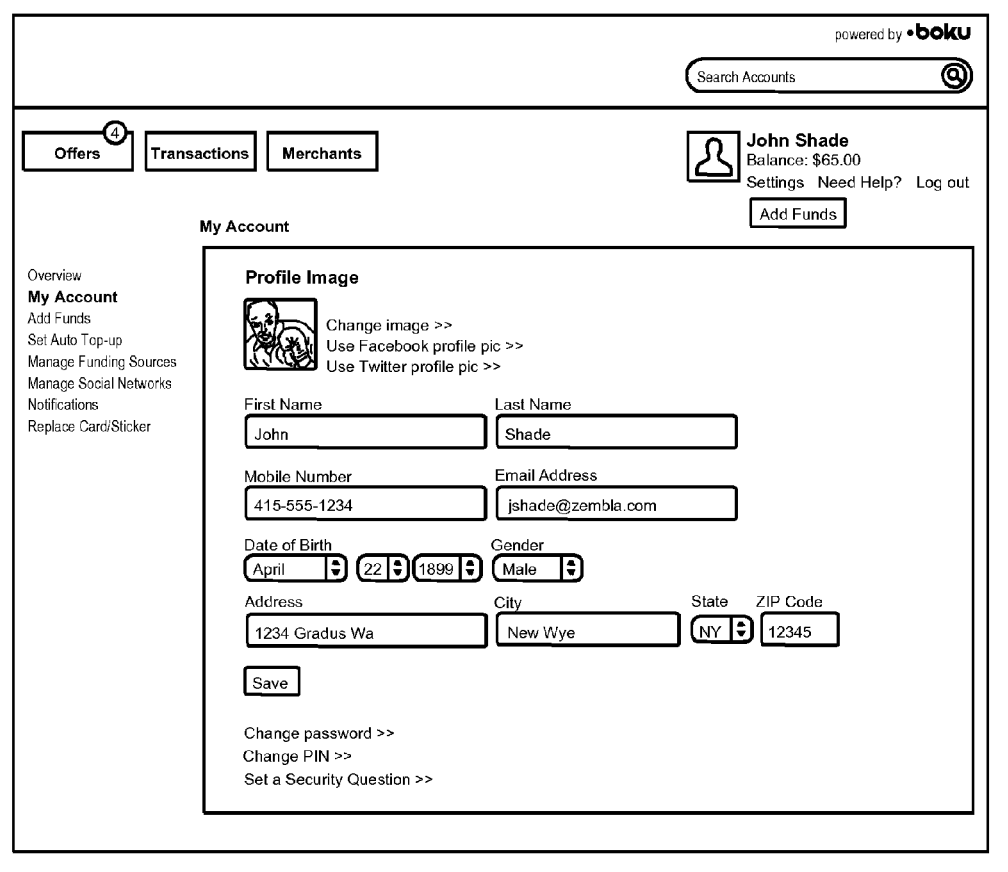

FIG. 3A illustrates the interface 68 as it appears within a browser window of a browser application at the consumer computer system 14 in FIG. 2 after a consumer has entered the correct MSISDN and password. The screenshot in FIG. 3A allows for the consumer to update or modify personal information. Of significance is that the user can update a MSISDN in the field "Mobile Number."

Figure 2B:
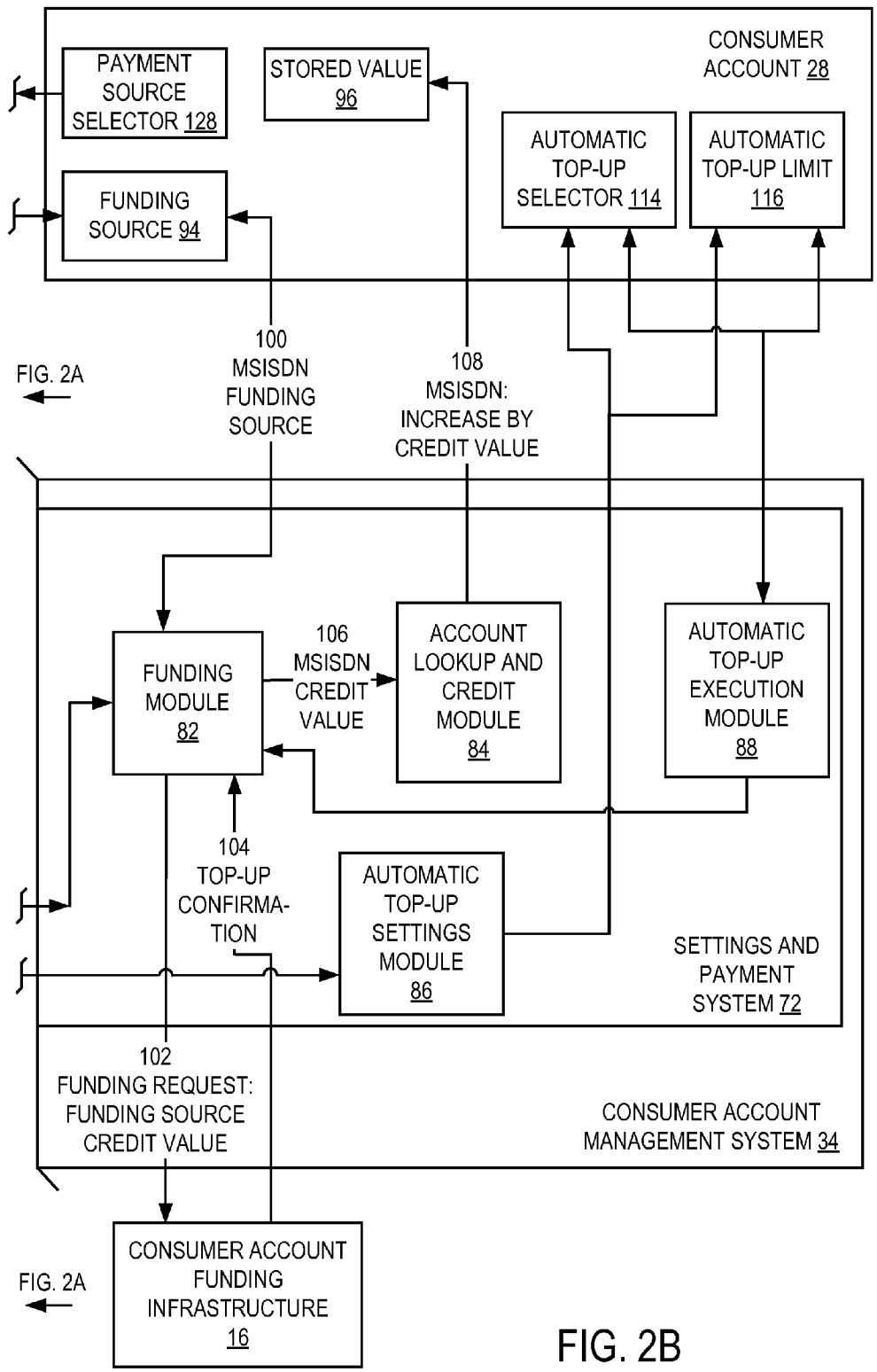
Figure 3B:
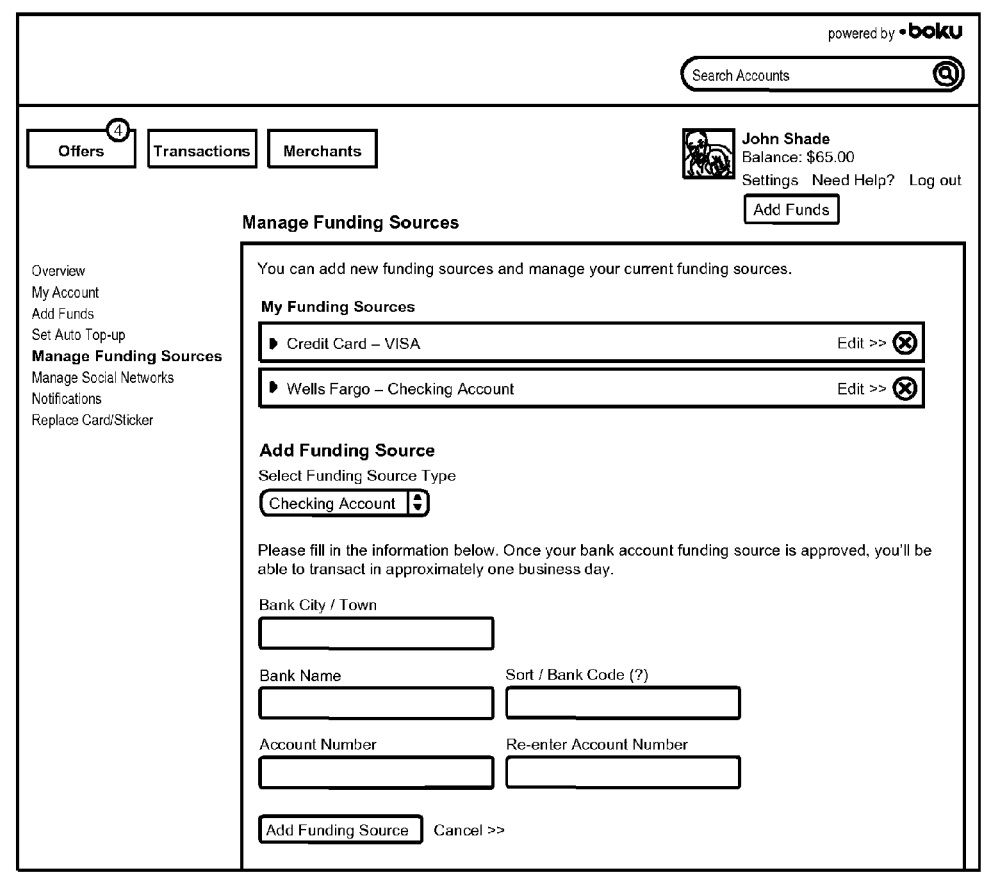

FIG. 3B illustrates a screenshot that allows for the consumer to manage funding sources such as the funding source 94 in FIG. 2B. Two funding sources are already stored, one for "Credit Card—VISA" and another for "Wells Fargo—Checking Account." The consumer also has the option of adding further funding sources, or to edit or delete existing funding sources.

Figure 3C:
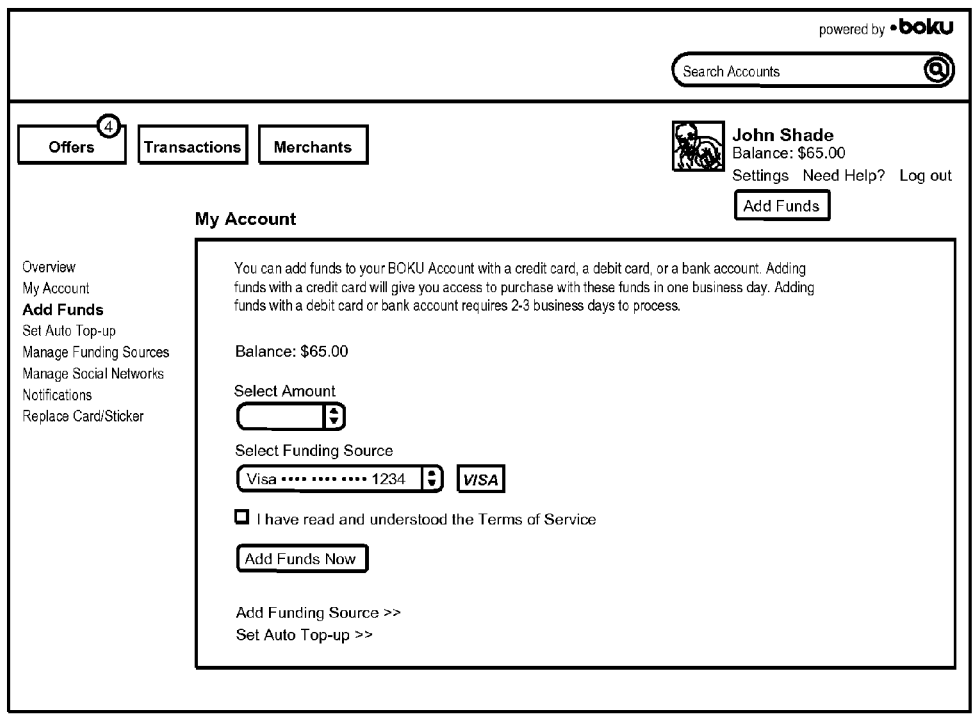
FIG. 3C is a view similar to FIG. 3B for the consumer to replenish the stored valued.

In FIG. 3C the consumer transfers funds from one of the funding sources to the stored value, i.e. from a funding source within the consumer account funding infrastructure 16 to the stored value 96 in FIG. 2B. Fields are provided for a credit amount ("Select Amount") and for the respective funding source ("Select Funding Source") which is to be used for the transfer.

Figure 3D:
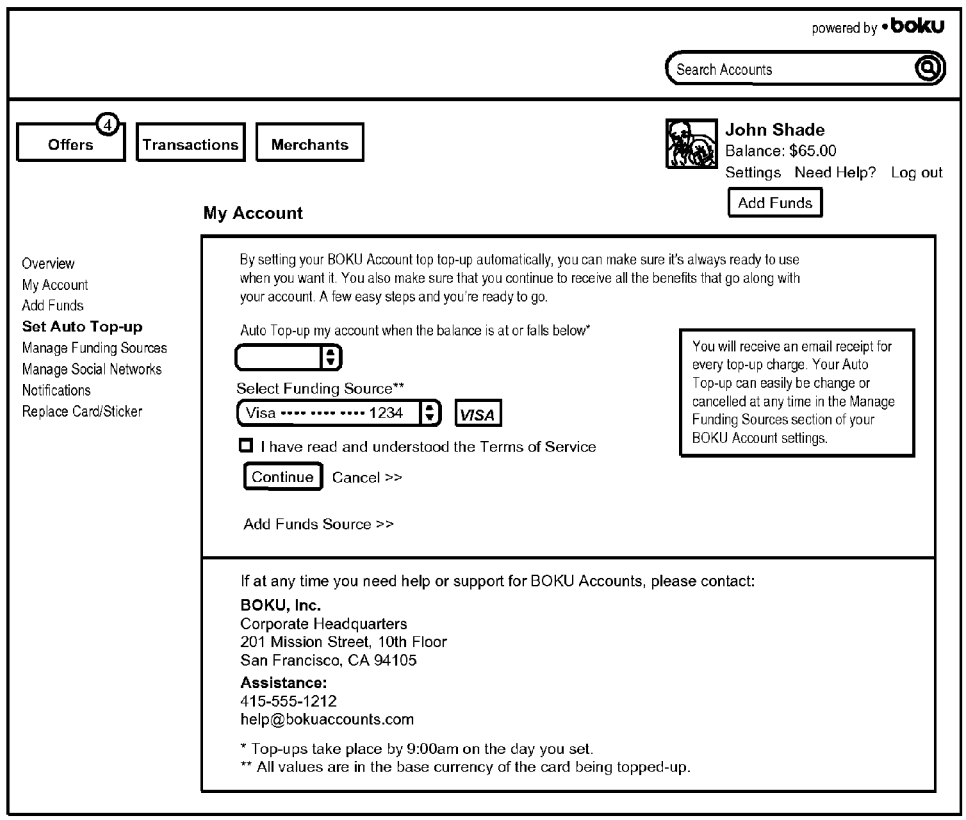
FIG. 3D is view similar to FIG. 3C for the consumer to select automatic top-up of the stored value.

In FIG. 3D the consumer is given the option to select automatic top-up details of the stored value, as described with reference to FIG. 2B. A field is provided for the consumer to select automatic top-up when the account balance falls below a certain amount. If the field is left empty, the automatic top-up selector 114 in FIG. 2B will be set to "Off." If any amount is entered into the field, the automatic top-up selector 114 in FIG. 2B will be set to "On" and the respective amount selected would be stored in the automatic top-up limit 116 in FIG. 2B. The consumer is also given an option to select the respective funding source from which the automatic top-up should take place.

As shown in FIGS. 4A and B, the merchant account 36 is established by assigning a merchant account identifier (ID) 130 and a password 132. Each merchant account 36 will thus have a different merchant account ID 130.

The merchant account management system 38 includes an interface 134, a login module 136, an upload and payment module 138, and a consumer targeting system 140.

A merchant at the merchant computer system 20 can log into the merchant account 36 by downloading the interface 134 and entering a merchant account ID 142 and a password 144 through the interface 134 into the merchant account management system 38. The login module 136 then compares the merchant account ID 142 and the password 144 with the merchant account ID 130 and password 132 to identify and provide access to the respective merchant account 36. The login module 136 then at 146 authorizes access to the upload and payment module 138 by the merchant computer system 20 only for purposes of the respective merchant account 36 having the merchant account ID 130 matching the merchant account ID 142. At 148, the login module 136 similarly authorizes access to the consumer targeting system 140 by the merchant computer system 20.

At 150, the consumer targeting system 140 receives data from the consumer account 28 and all other consumer accounts. At 152, the merchant computer system 20 accesses the data received by the consumer targeting system 140 at 150. A merchant at the merchant computer system 20 can then selectively target a specific consumer account 28 or groups of consumer accounts based on the data received at 150.

The upload and payment module 138 includes a voucher upload module 154, a payment calculation module 156, and a payment module 158. A merchant at the merchant computer system 20 uses the interface 134 to enter voucher information, including terminal numbers 160, items 162, discounts 164 and the total number available 166. The voucher upload module 154 then stores a respective voucher entry 168 in or associated with the merchant account 36 having the merchant account ID 130. The voucher entry 168 includes terminal numbers 170 corresponding to the terminal numbers 160, items 172 corresponding to the items 162, a discount 174 corresponding to one of the discounts 164, and a total number available 176 corresponding to the total number available 166. By way of example, the terminal numbers 170 may be terminals 2 and 5, the items 172 may be one can of Coca-Cola™ and one can of Pepsi™, the discount 174 may be 50 cents and the total number available 176 may be 60.

Similarly, additional voucher entries 178, 180 and 182 can be entered from the merchant computer system 20 through the interface 134 and the voucher upload module 154. Each voucher entry 178, 180 and 182 has a respective data set for terminal numbers 170, items 172, a discount 174 and the total number available 176. Each voucher entry 168, 178, 180 and 182 also has a respective voucher ID 184.

Once a voucher entry, for example the voucher entry 168, has been uploaded into the merchant account 36, the payment calculation module 156 calculates a payment to be made based on the voucher entry. In the example, it is assumed that the voucher entry 168 was pre-existing with a certain number, for example 20 as the total number available. The payment calculation module 156 at 190 receives or calculates the number added to the total number available 176. In the present example, the total number available 176 has increased from 20 to 60, such that the number added is 40. The payment calculation module 156 at 192 also receives the discount 174. The payment calculation module 156 then multiplies the number added by the discount 174. In the present example, the number added is 40 and the discount is 50 cents, which results in a payment of $20.

The payment calculation module 156 then submits the $20 charge to the payment module 158. The merchant then enters a payment 194 into the interface 134, which is received by the payment module 158. The payment module 158 communicates with the merchant account payment infrastructure 22 by submitting a charge request and receiving a confirmation to either confirm or deny the charge request. In another example, the merchant account 36 may have a stored value 96 that can be updated from a funding source and the payment module 158 can decrement the stored value 96 by entering a debit against the stored value 96. The voucher management system 42 includes a voucher push module 196 and a voucher redemption system 198.

The voucher push module 196 at 200 receives all the voucher ID's 184 of the voucher entries 168, 178, 180 and 182. The voucher push module 196 at 202 then enters the voucher ID's 184 as voucher ID's 204 in the consumer account 28 and all other consumer accounts that have been targeted by a merchant. As such, merchant offers in the form of voucher ID's are associated with one of the consumer accounts 28 having a MSISDN 66 as a consumer account ID. The merchant offers in the form of the voucher ID's 204 can then be further processed based on the association of the voucher ID's 204 with the MSISDN 66 of the respective consumer account 28. In particular, the voucher ID's 204 can be transmitted to a mobile device 24 and be received by a mobile application that has been logged into the respective consumer account 28 by way of an identifier of the consumer account 28 having the MSISDN 66 as a consumer account identifier. As will be shown, it is the MSISDN 66 itself that serves as the identifier for login to the mobile application of the consumer account 28. The MSISDN 66 thus serves as a consumer account identifier for the consumer account 28 and as an identifier for the mobile application.

Figure 4B:
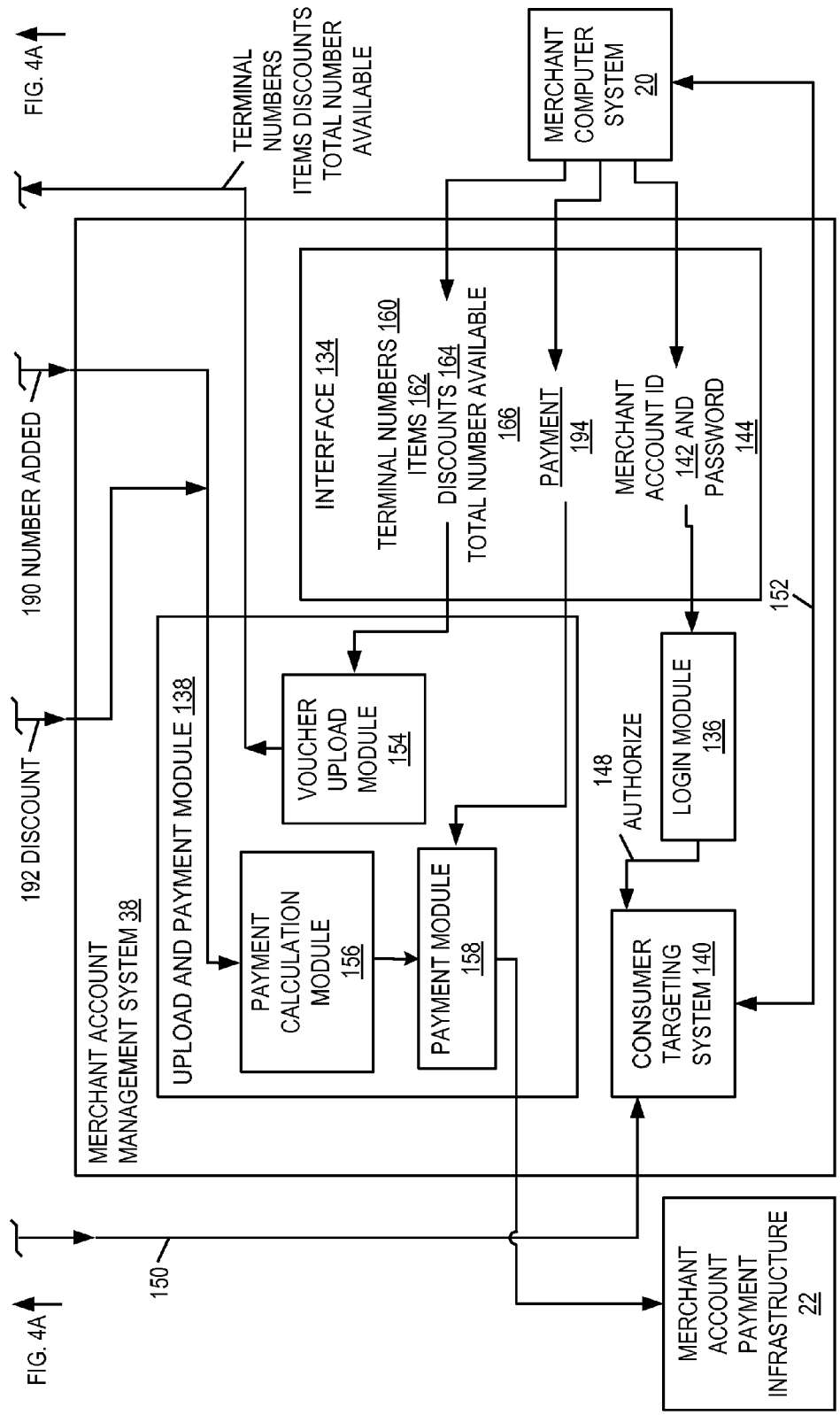
FIGS. 4A and B are a block diagram illustrating an interaction between a merchant computer system and a merchant account management system to establish offers in the form of vouchers, which are then forwarded by voucher management system and entered into one or more consumer accounts.
Figure 5A:
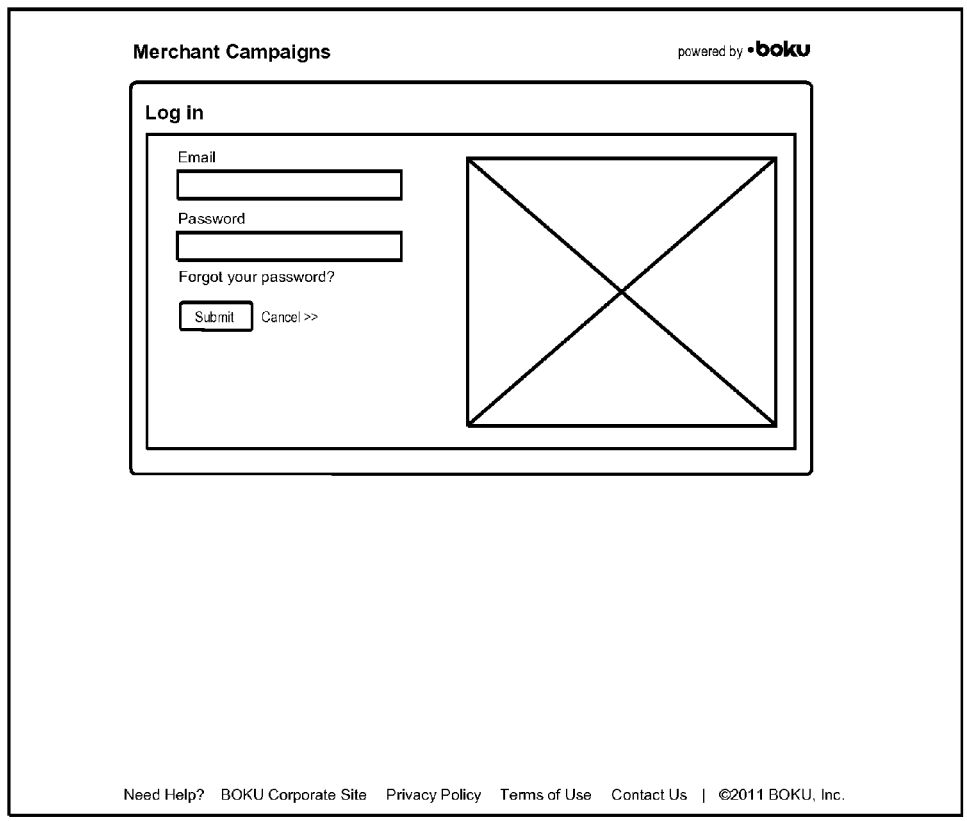
FIG. 5A is a screenshot that appears within a browser of the merchant computer system for a merchant to log into the account.

FIG. 5A illustrates a screenshot that appears in the interface 134 when viewed within a browser window of a browser application at the merchant computer system 20 in FIG. 4B. The merchant logs in using an email and a password.

Figure 5B:
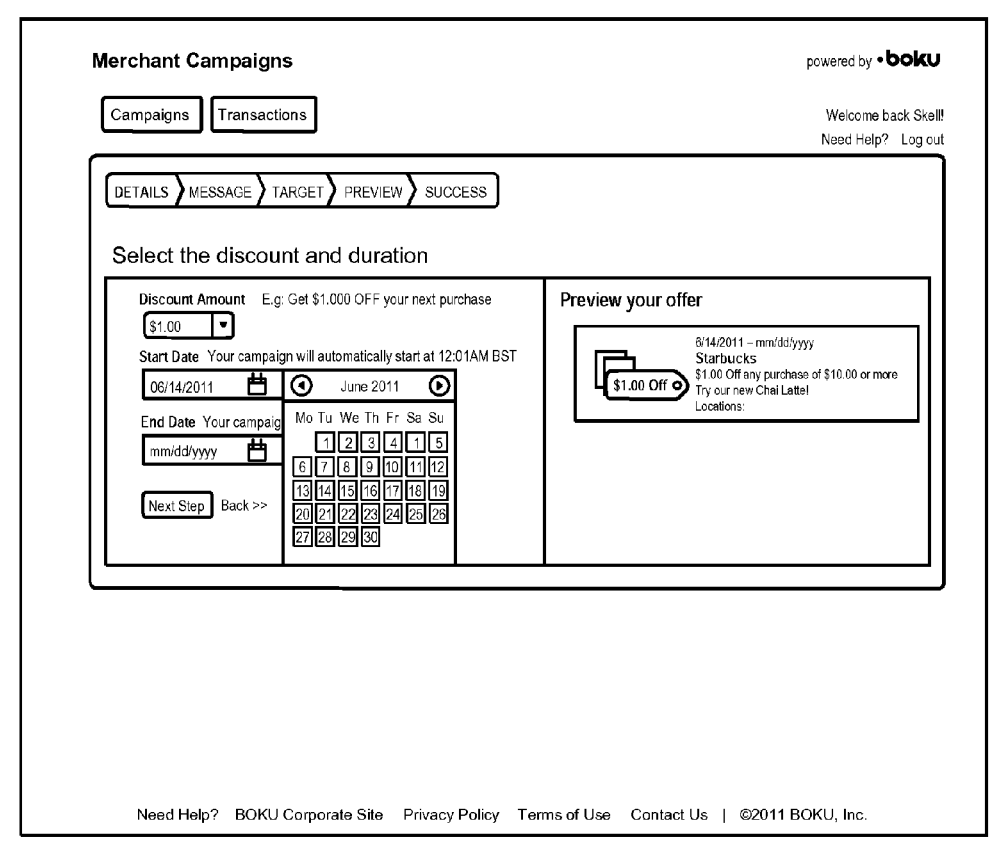

FIG. 5B illustrates a screenshot that is displayed at the merchant computer system 20 after login and when a merchant begins to enter details of an offer. The interface 134 allows for entry of a discount ("Discount Amount") and start and end dates of the offer. A preview of the offer is also displayed.

Figure 5C:
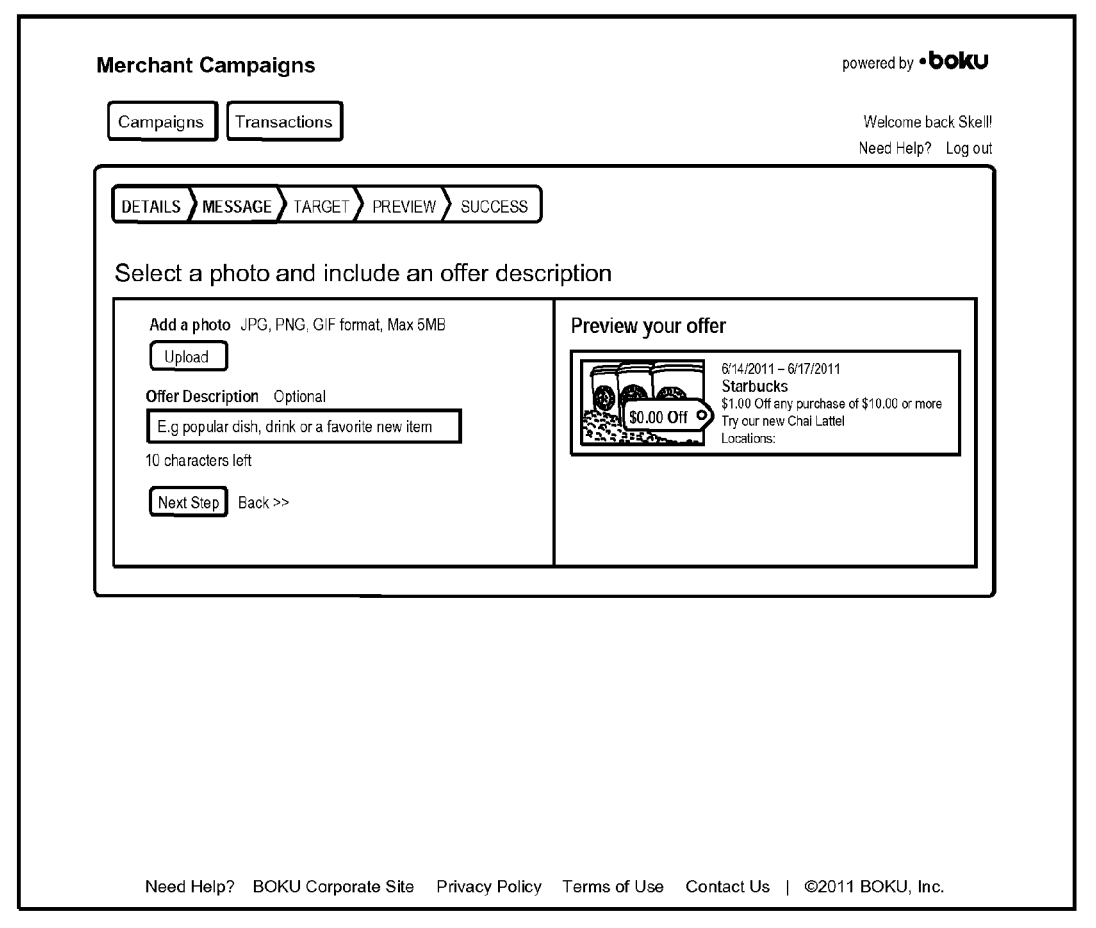

In FIG. 5C the merchant is given an opportunity to upload a photo or other image of the offer. The photo or image will then be displayed within the respective voucher entry, e.g. the voucher entry 168 in FIG. 4A. The photo or image can be uploaded from the merchant computer system 20 or from another location on a network.

Figure 5D:
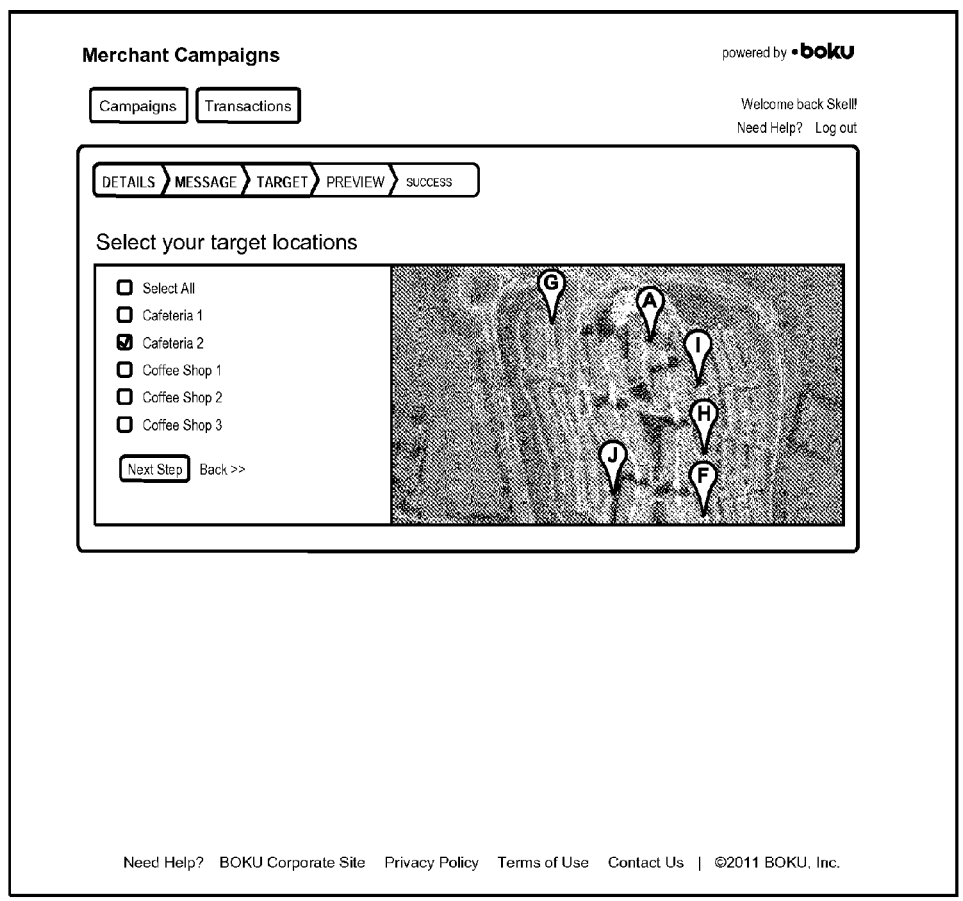
FIG. 5D is a view similar to FIG. 5C where the merchant can select specific terminals or groups of terminals where the offer will be valid.

In FIG. 5D the merchant is given an opportunity to restrict the offer to certain locations, while excluding other locations.

Figure 5E:
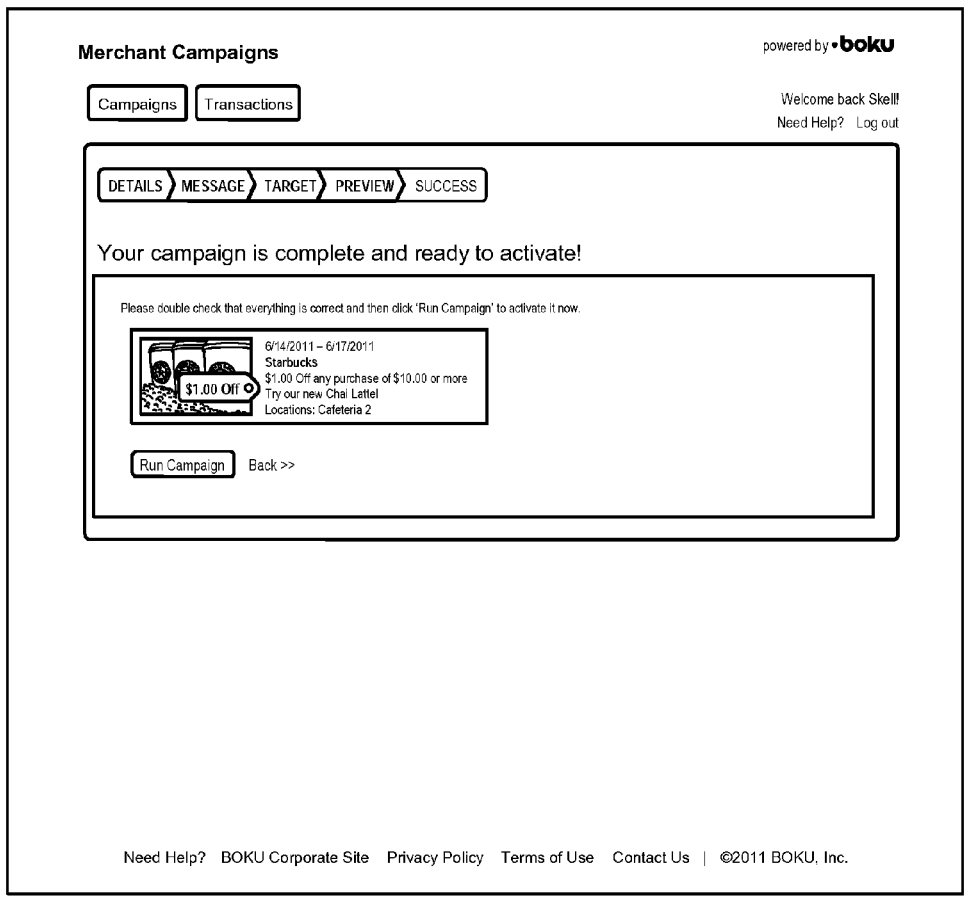
FIG. 5E is a view similar to FIG. 5D where the merchant can view the offer before approving the offer.

In FIG. 5E the merchant is given an opportunity to preview the offer as it will appear before approving the offer. The merchant then selects a button "Run Campaign" to approve the offer.

Figure 5F:
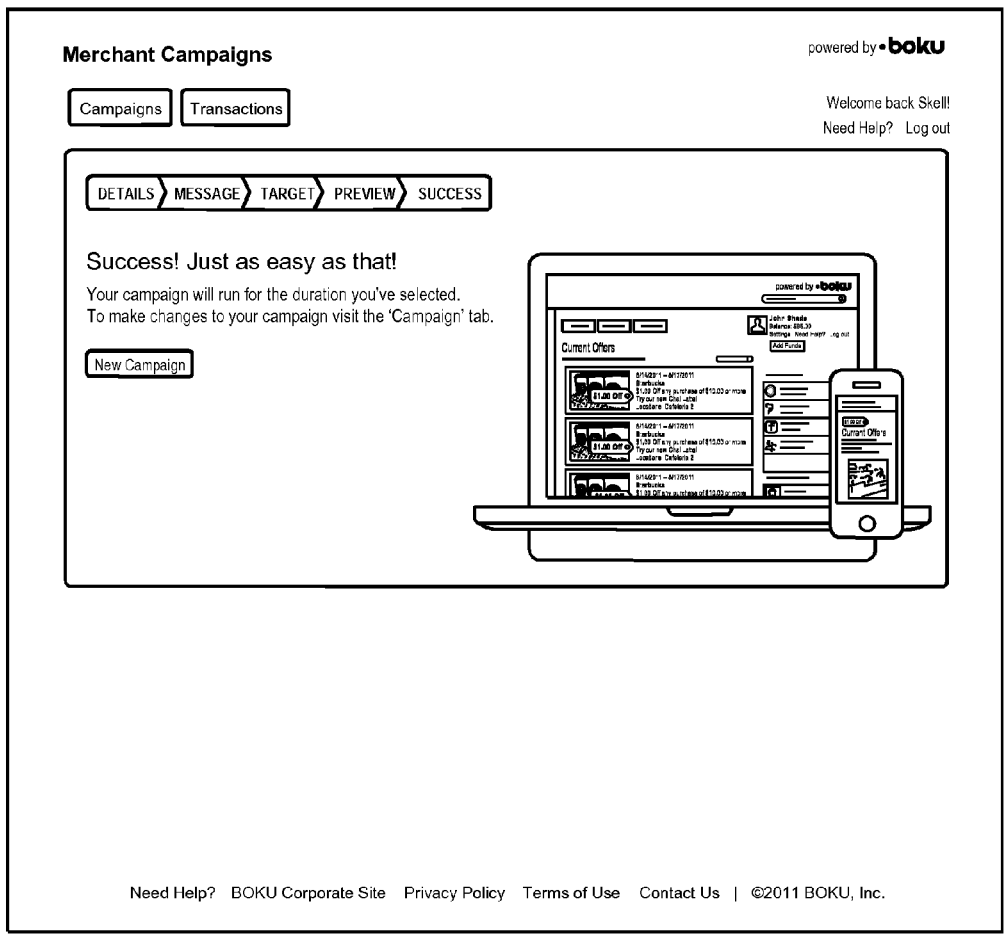
FIG. 5F is a view similar to FIG. 5E after the offer has been approved by the merchant.

FIG. 5F is a screenshot displaying to the merchant that the offer is successful. The consumer can then select a button "Campaigns."

Figure 5G:
FIG. 5G is a view similar to FIG. 5F displaying multiple campaigns based on the merchant account.

FIG. 5G illustrates a screenshot that is subsequently displayed to the merchant, illustrating the offer that has just been approved by the merchant and all other offers that are scheduled, completed or presently running based on the respective merchant account having the merchant account ID 130 in FIG. 4A.

Figure 6A:
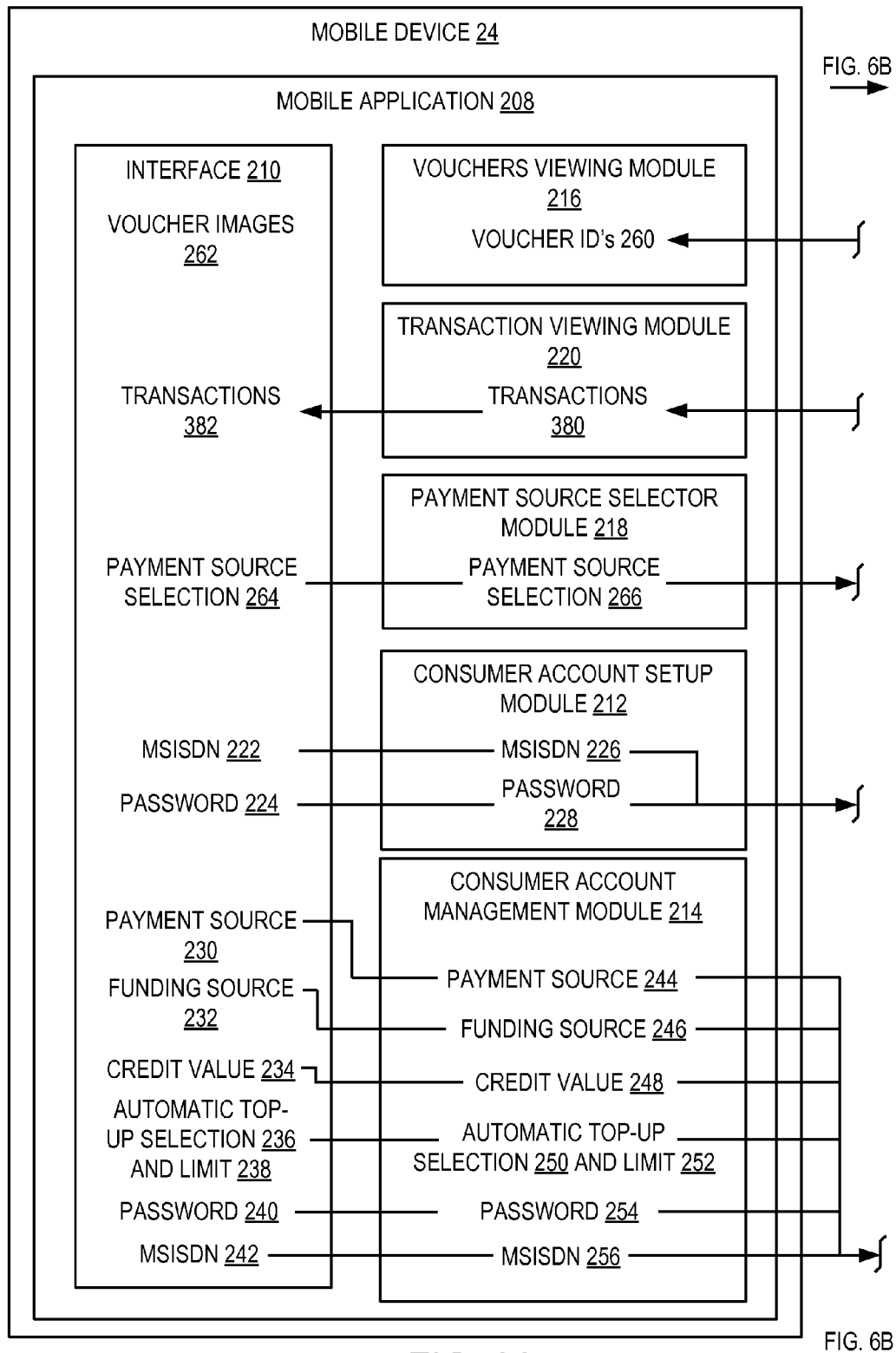
FIGS. 6A and B are a block diagram illustrating interaction between a mobile application on a mobile device on the one hand and on the other with a consumer account setup module, the consumer management system, and components of the consumer account.

Referring to FIGS. 6A and B, the mobile device 24 includes a mobile application 208. The mobile application 208 has an interface 210, a consumer account setup module 212, a consumer account management module 214, a vouchers viewing module 216, a payment source selector module 218, and a transaction viewing module 220.

When the application 208 is initially downloaded onto the mobile device 24, the user is provided access to the consumer account setup module 212. The user can enter a MSISDN 222 and a password 224 into the interface 210. The MSISDN 222 and the password 224 are received as a MSISDN 226 and a password 228 within the consumer account setup module 212 and are transmitted by the consumer account setup module 212 to the consumer account setup module 32 in FIG. 1. The consumer account 28 can be thus be established on the mobile application 208 in a manner similar to the manner that the consumer account 28 can be established from the consumer computer system 14 as hereinbefore described with reference to FIGS. 2A and B.

In addition, the consumer account management module 214 allows for entry of a payment source 230, a funding source 232, a credit value 234, an automatic top-up selection 236 and limit 238, password 240, and MSISDN 242 into the interface 210 and are respectively received by the consumer account management module 214 as a payment source 244, funding source 246, credit value 248, automatic top-up selection 250 and limit 252, password 254 and MSISDN 256, and are then provided to the consumer account management system 34 as hereinbefore described with reference to FIGS. 2A and B.

Following login of the mobile application 208 into the consumer account 28, the vouchers viewing module 216 is accessible by a consumer operating the mobile device 24. The consumer then directs the vouchers viewing module 216 to download the voucher ID's 204 from the consumer account 28 as voucher ID's 260 received by the vouchers viewing module 216. Each voucher ID 260 has an associated image and the images are collectively displayed as voucher images 262 within the interface 210. Each voucher entry 168, 178, 180 and 182 within the merchant account 36 (FIG. 4A) may for example have a respective voucher image and the voucher images are separately downloaded by the voucher viewing module 216 based on the voucher ID's 260. What is important to note however, is that the voucher ID's 260 and the voucher images 262 are transmitted by the server computer system 12 and are received by the mobile device 24 based on a matching of the MSISDN 256 transmitted by the mobile application 208 and the MSISDN 66 of the respective consumer account 28.

The payment source selector module 218 allows for entry of the payment source selection 264 in the interface 210, which is received within the payment source selector module 218 as a payment source selection 266. The payment source selector module 218 then transmits the payment source selection 266 to the consumer account 28 to set the payment source selector 128. A selection made as a payment source selection 264 within the interface 210 will thus set the payment source selector 128 to point to one of the payment sources 122 or 124 or to the setting for use stored value 126. The payment source selector 128 can only point to one of the payment sources 122 or 124 or used stored value 126 at any particular time, depending on the selection made by the payment source selection 264.

Figure 7A:
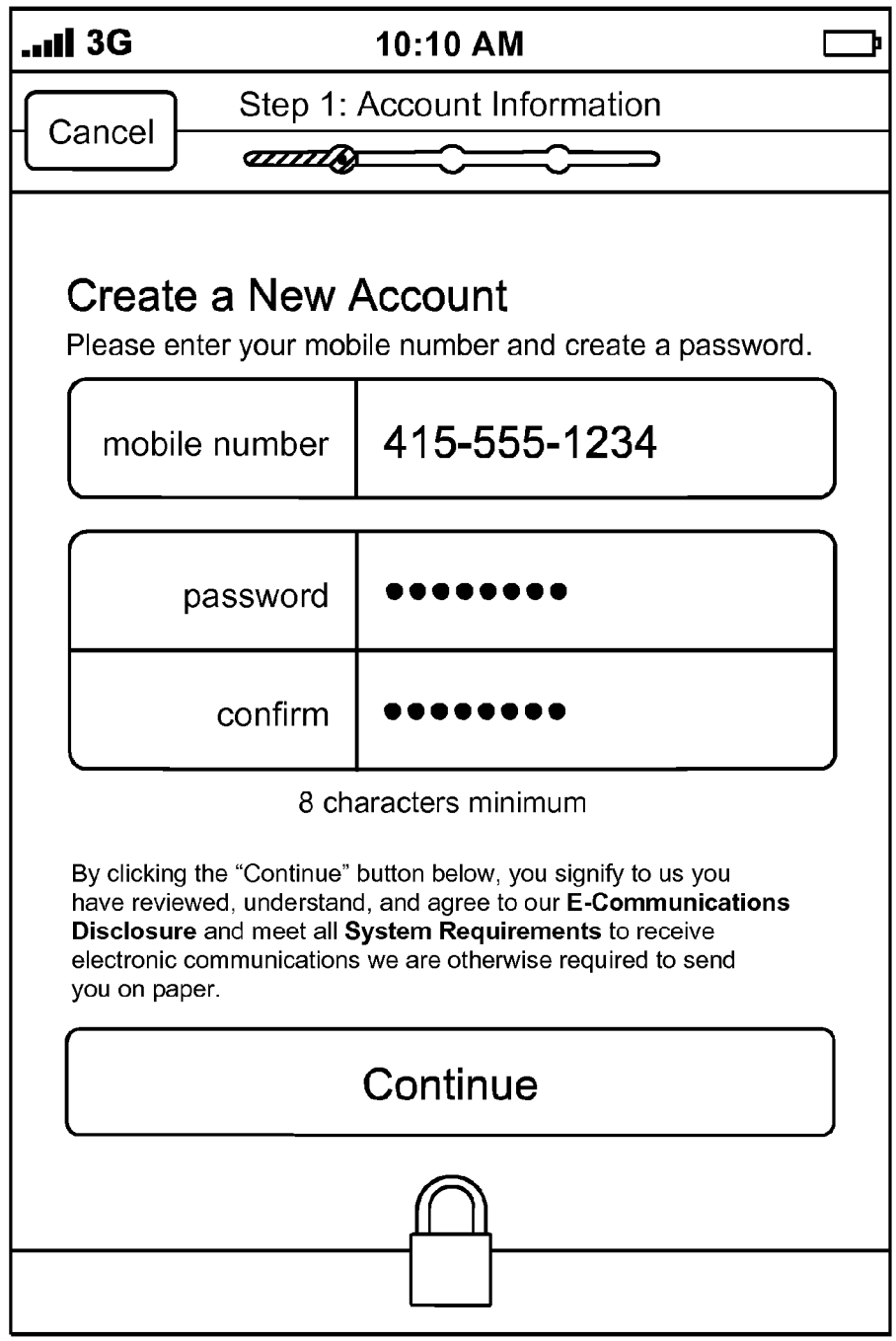
FIG. 7A is a screenshot that appears on an interface provided by the mobile application for a consumer to establish an account.
Figure 7B:
FIG. 7B is a view similar to FIG. 7A for the consumer to enter further details of the account.

FIG. 7A illustrates a screenshot on the Interface 210 in FIG. 6A when the consumer first establishes an account using the consumer account setup module 212. FIG. 7B is a view similar to FIG. 7A for the consumer to enter further details of the account.

Figure 7C:
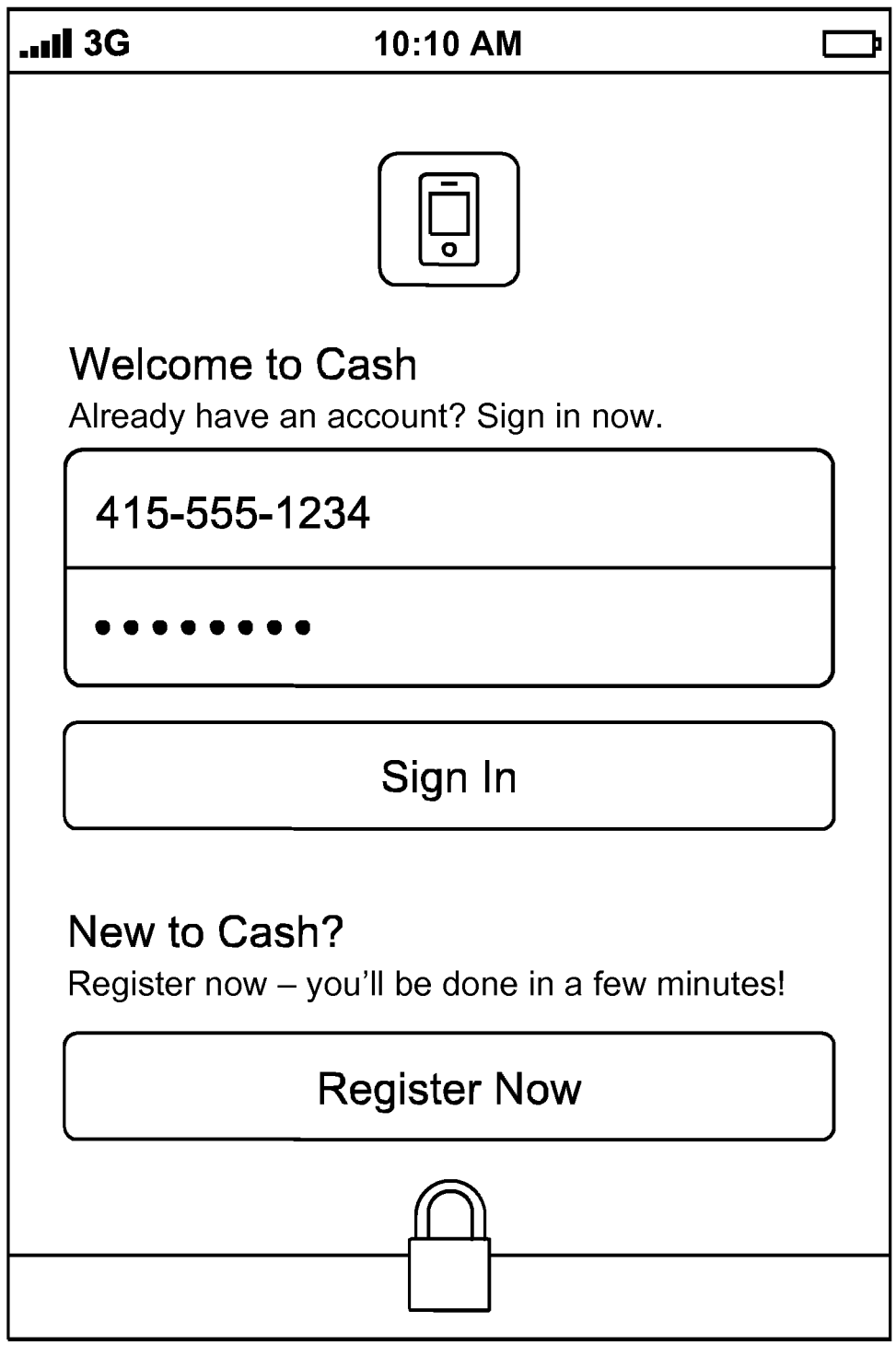
FIG. 7C is a view similar to FIG. 7B for the consumer to log into the account.
Figure 7D:
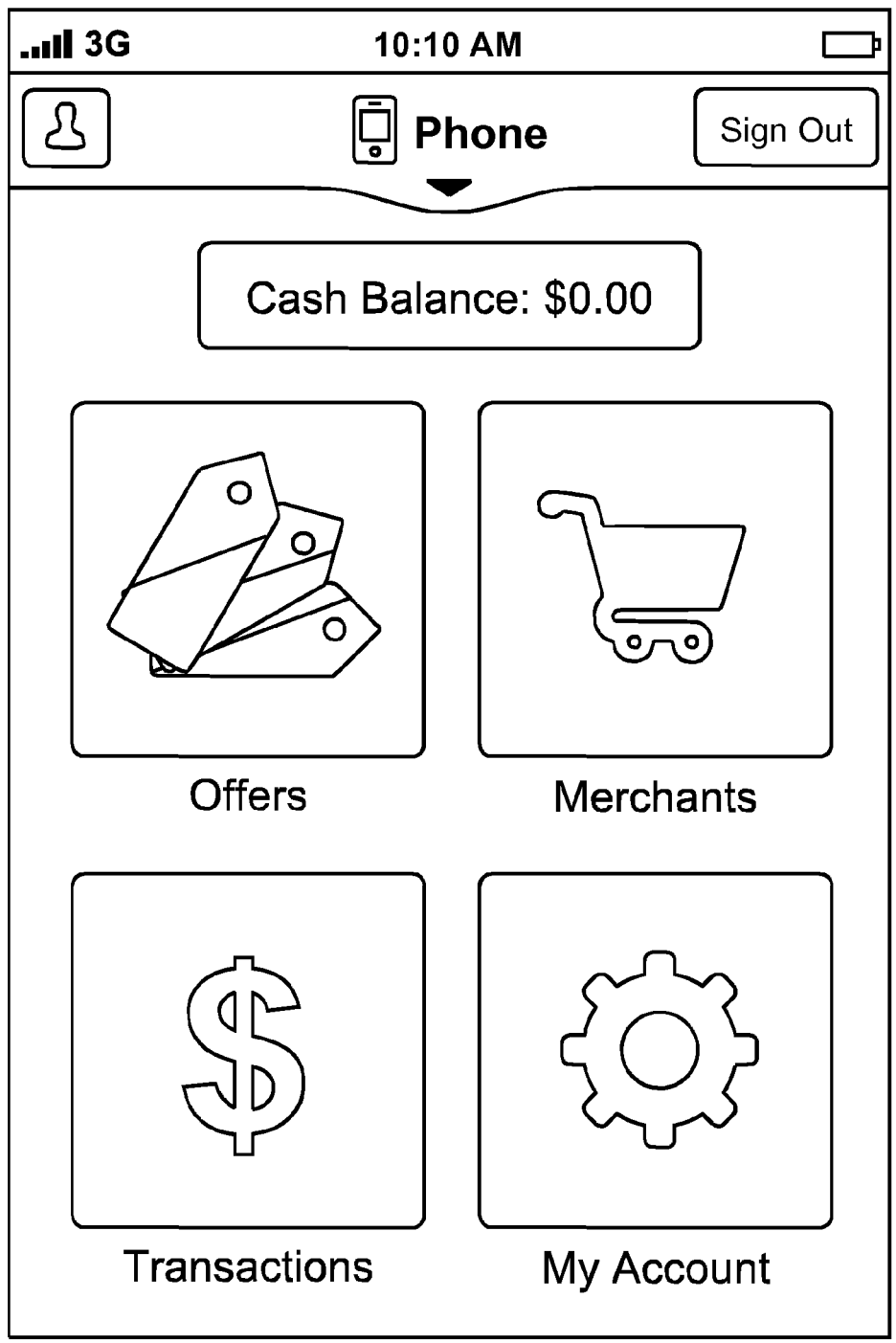
FIG. 7D is a view similar to FIG. 7C after the consumer has logged into the account.
Figure 7E:
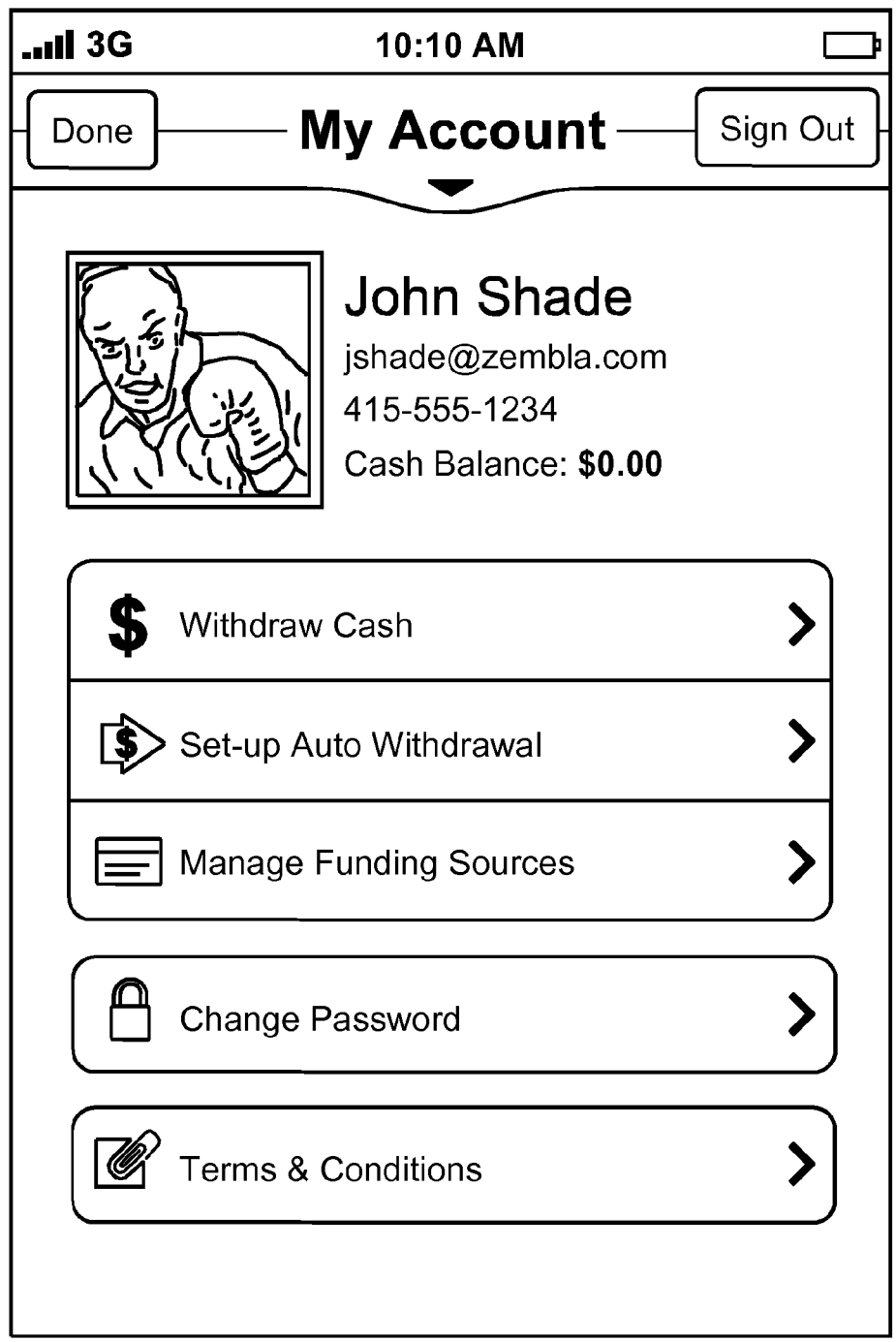
FIG. 7E is a view similar to FIG. 7D after the consumer has navigated to an account management page.

FIG. 7C is a view that is displayed on the interface 210 in FIG. 6A when the consumer uses the consumer account management module 214 to enter the password 240 and the MSISDN 242 in order to log into the respective consumer account. FIG. 7D is a view that is displayed on the Interface 210 following login by the consumer. The view in 7D includes links to "Offers," "Merchants," "Transactions," and "My Account." FIG. 7E is a view that is displayed on the Interface 210 after the consumer has selected the link to "My Account" in FIG. 7D.

Figure 7F:
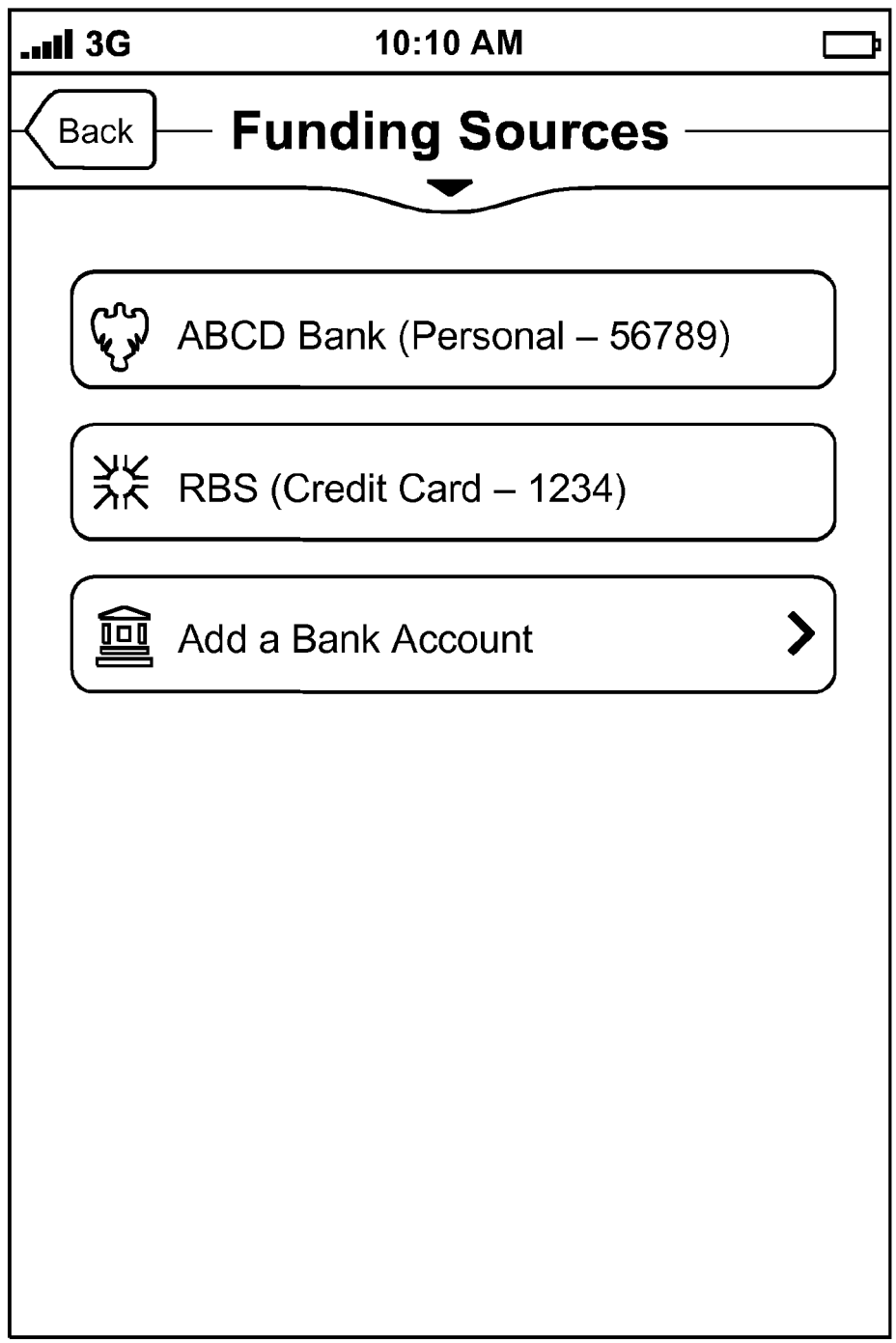
FIG. 7F is a view similar to FIG. 7E displaying funding sources of the account.
Figure 7G:
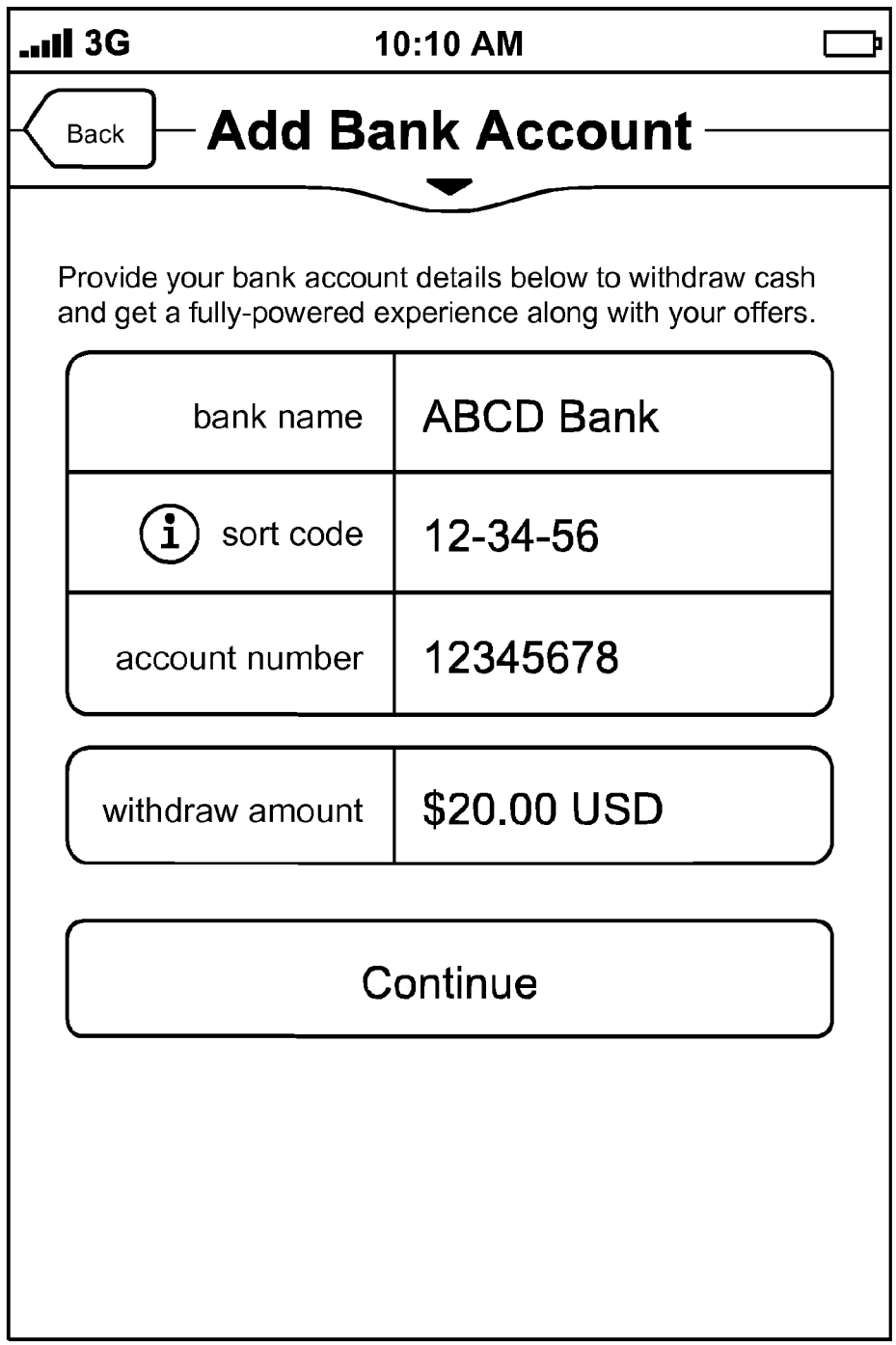
FIG. 7G is a view similar to FIG. 7F for the consumer to enter a further funding source.

In FIG. 7F the funding sources that have been established by the consumer are displayed. FIG. 7G is a view that allows for the consumer to add a funding source such as the funding source 232 in FIG. 6A.

Figure 7H:
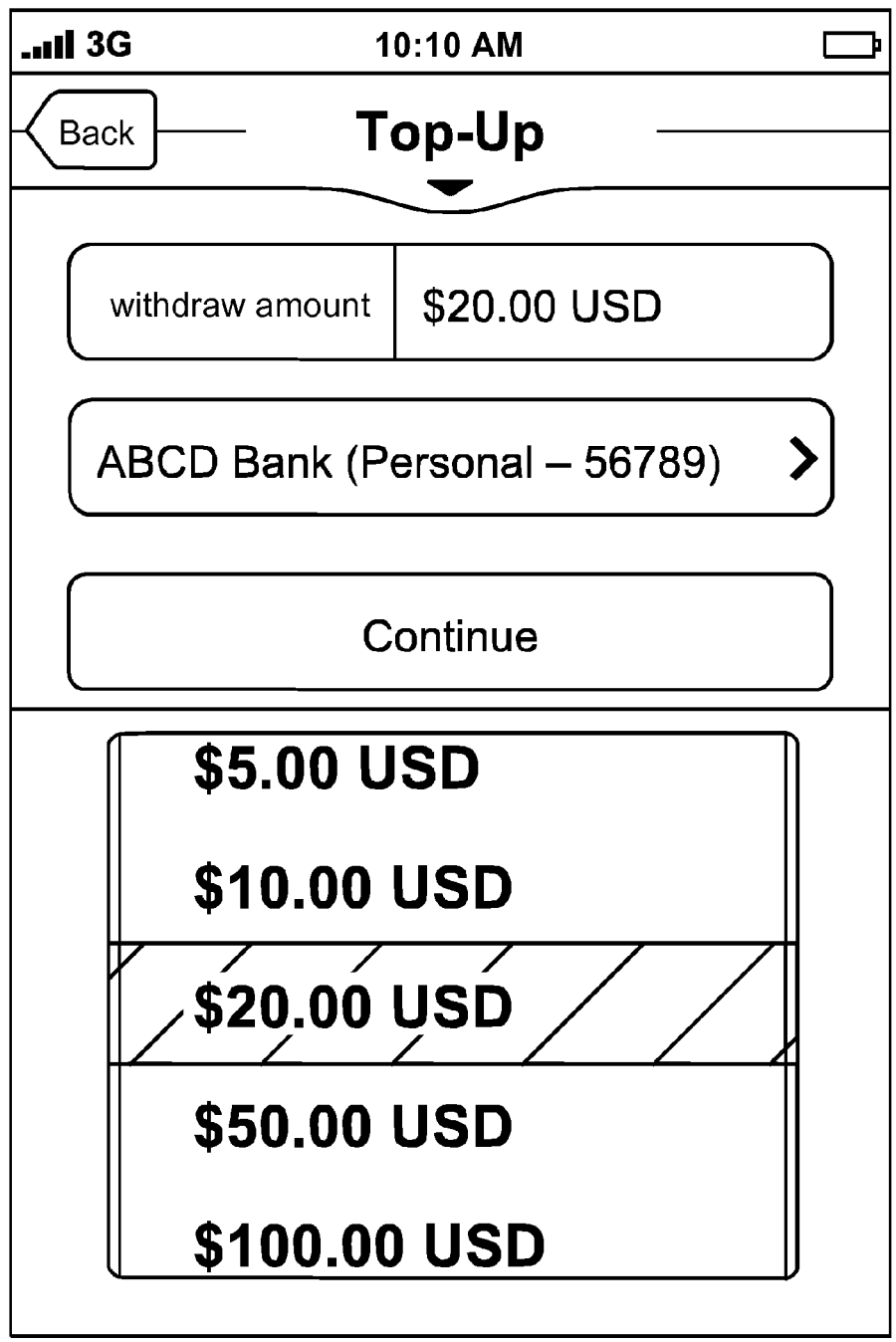
FIG. 7H is a view similar to FIG. 7G wherein the consumer uses a top up feature to transfer funds from a funding source to the stored value.

FIG. 7H is a view that is displayed wherein the consumer uses the top-up feature to transfer funds from a payment source to the stored value. In the example of FIG. 7H, the credit value 234 in FIG. 6A is $20. The consumer is also given a selection of a funding source from the funding sources in FIG. 7F for purposes of the transfer.

Figure 7I:
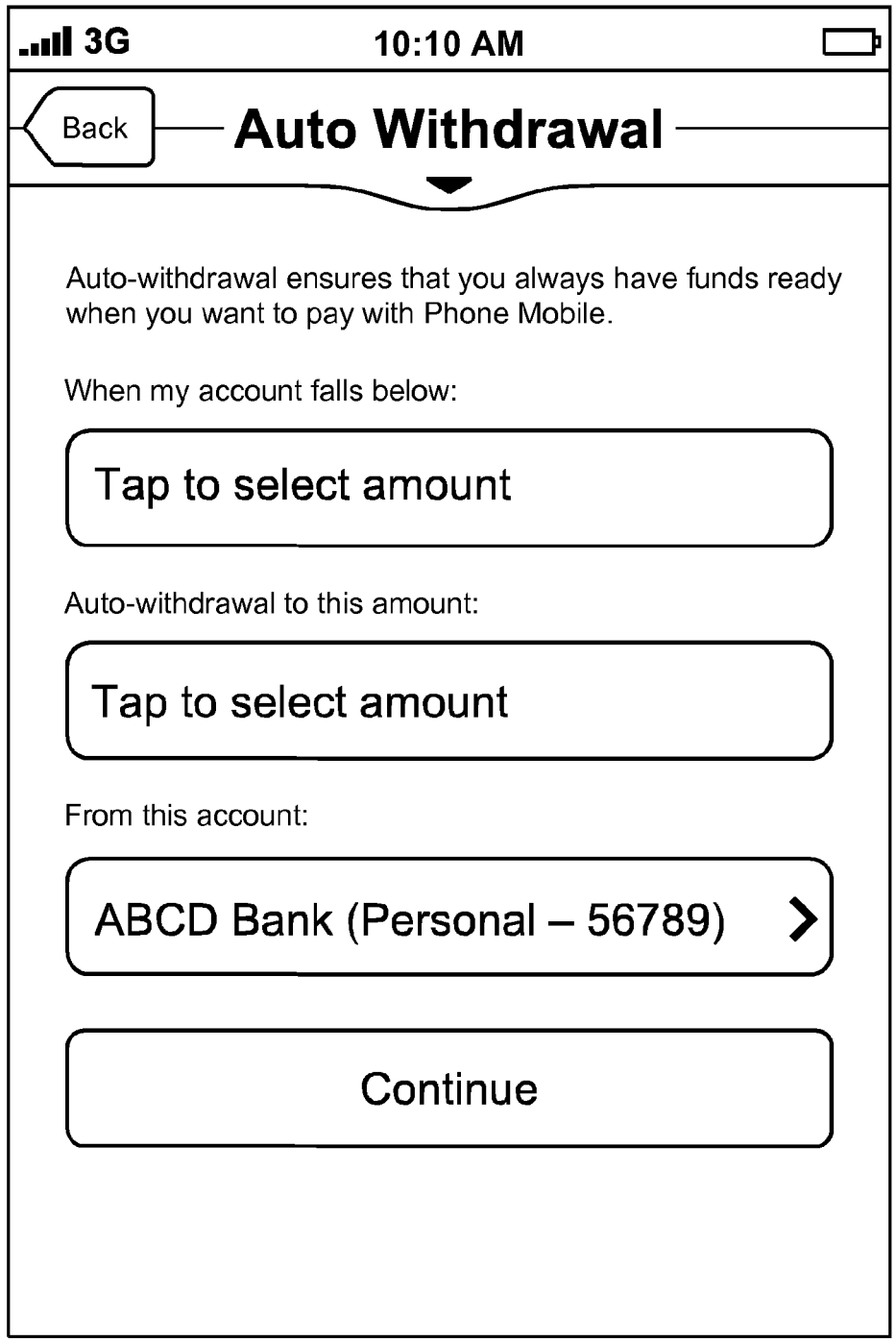
FIG. 7I is a view similar to FIG. 7H for the consumer to select automatic top-up settings.

FIG. 7I is a view that is displayed to allow the consumer to select the automatic top-up selection 236 and limit 238 in FIG. 6A. The consumer is given the option to select both a trigger amount for top-up to occur, i.e. when the stored value falls below a certain value, and to select the amount by which the stored value should be replenished. Again, the consumer is given the option to select one of a plurality of funding sources.

Figure 7J:
FIG. 7J is a view similar to FIG. 7I displaying offers that are available based on the consumer account.

FIG. 7J illustrates a plurality of voucher images such as the voucher images 262 in FIG. 6A. The consumer can select any one of the vouchers to obtain more information about the voucher and the offer.

Figure 6B:
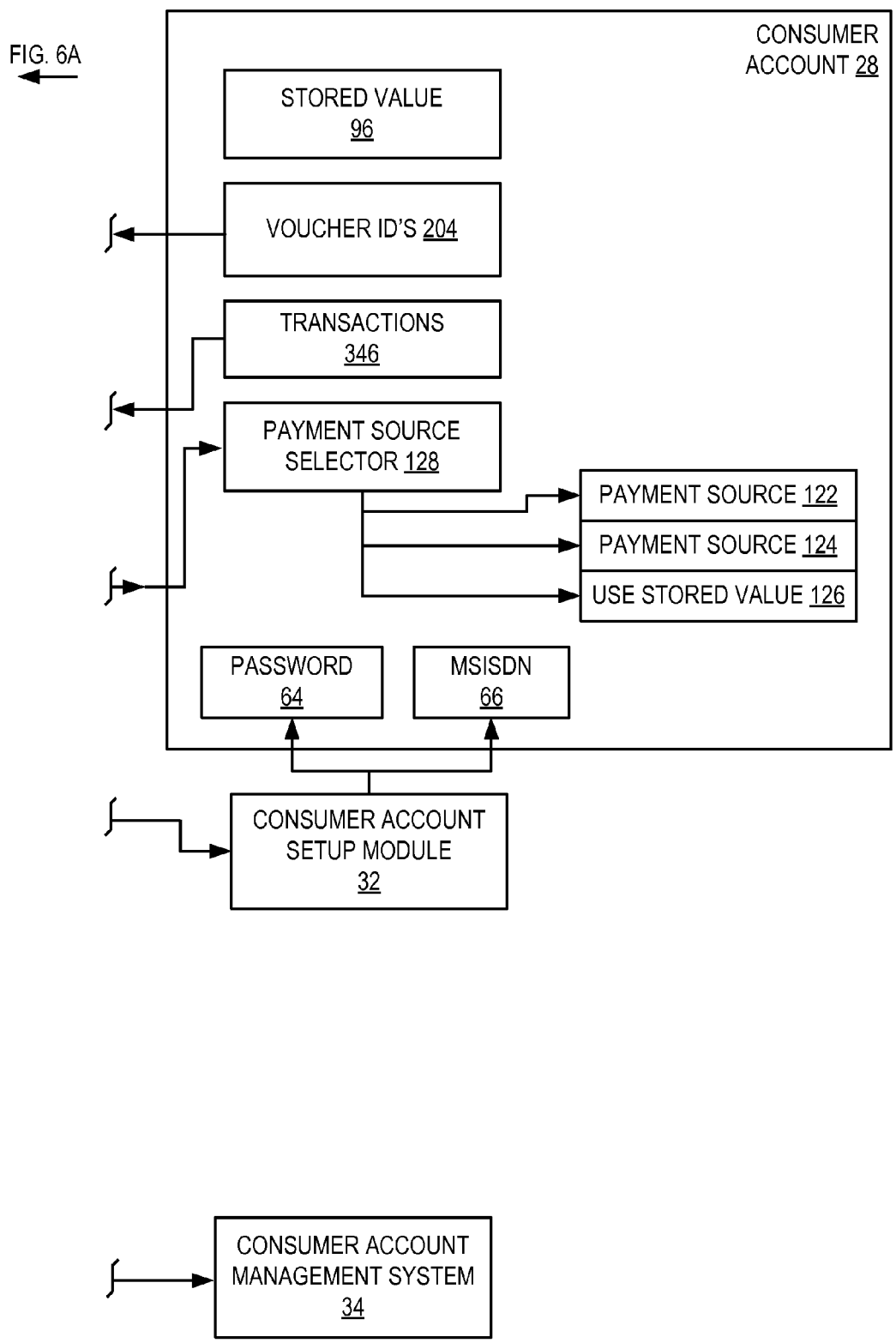
Figure 7K:
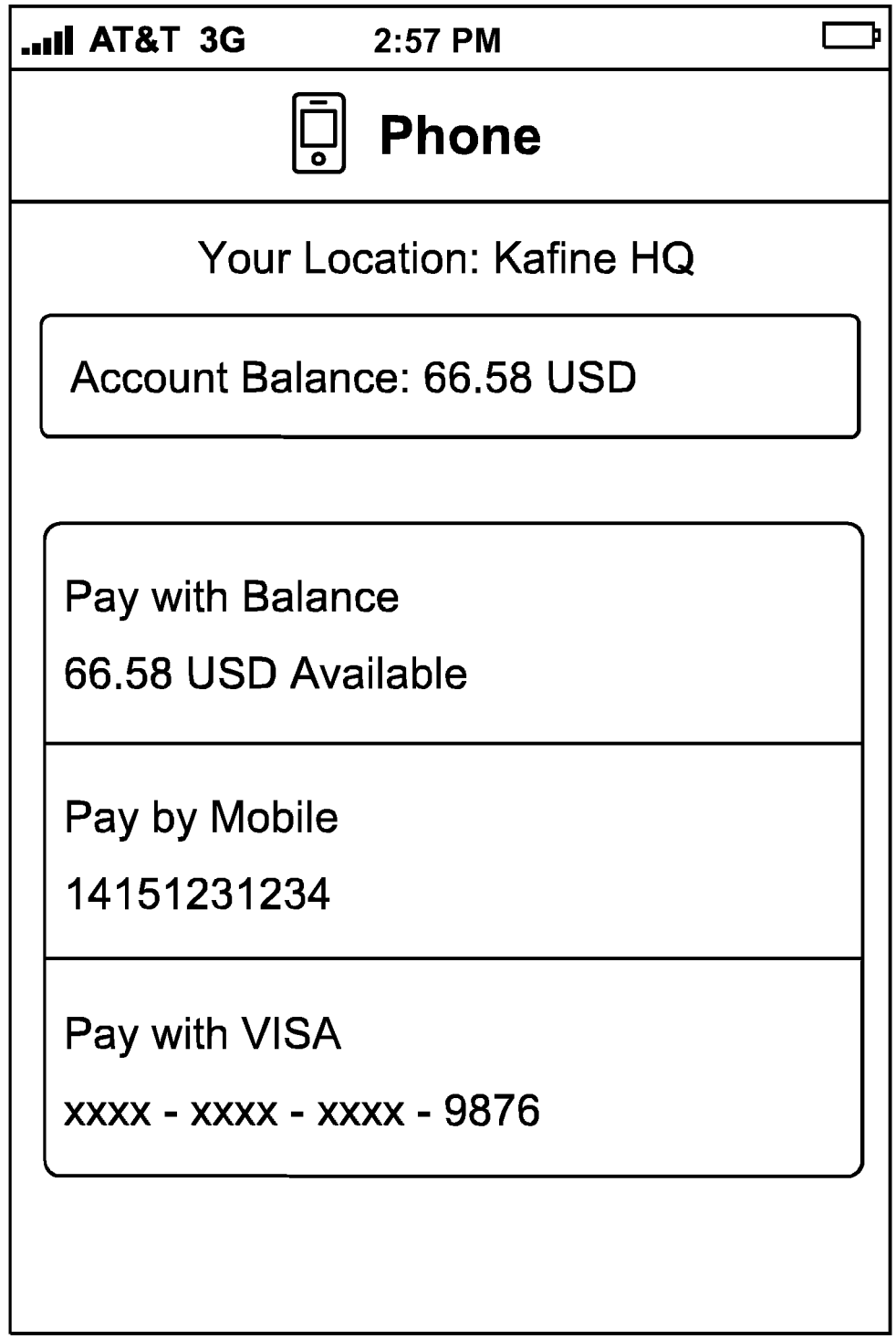
FIG. 7K is a view similar to FIG. 7J permitting a consumer to enter a pass-through payment source or to select whether payment should be made from the stored value of the account.

FIG. 7K is a view that is displayed to allow for the consumer to select a pass-through payment source or to pay using the stored value. By selecting one of the payment sources, the consumer makes the payment source selection 264 in FIG. 6A. As described above, the selection made in the view of FIG. 7K will set payment source selector 128 in FIG. 6B to point to one of the payment sources 122 or 124 or to point to the setting for use stored value 126.

Figure 8:
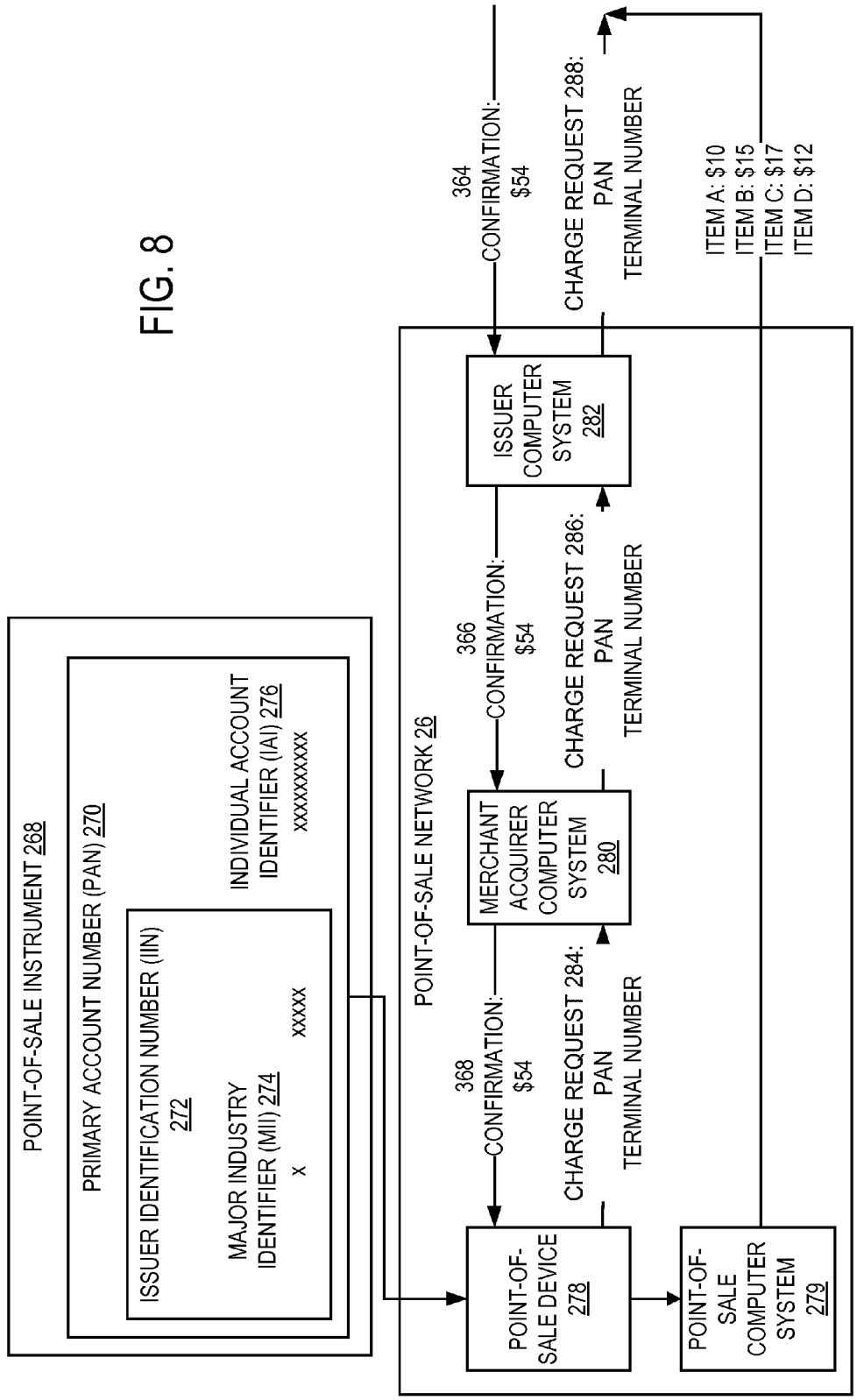
FIG. 8 is a block diagram of a point-of-sale instrument and a point-of-sale network that are used for point-of-sale transaction processing and for routing of a charge request and receiving confirmation if a transaction is good.

Referring to FIG. 8, the consumer uses a single point-of-sale instrument 268 to pay for an item that the consumer wishes to purchase. The point-of-sale instrument 268 may for example be a credit card, a bank card or a Near Field Communication (NFC) device. The point-of-sale instrument 268 includes a single 16 digit primary account number (PAN) 270. The first six digits of the PAN 270 are an issuer identification number (IIN) 272. The first digit of the IIN 272 is a major industry identifier (MII) 274. The last ten digits of the PAN 270 comprise an individual account identifier (IAI) 276.

The point-of-sale network 26 includes a point-of-sale device 278, a point-of-sale computer system 279, a merchant acquirer computer system 280, and an issuer computer system 282. In the present example, the consumer has chosen to purchase the following four items, item A: $10, item B: $15, item C: $17, item D: $12.

The total purchase is $54. An operator records the four items within the point-of-sale computer system 279. The consumer then uses the point-of-sale instrument 268 to communicate with the point-of-sale device 278. The point-of-sale device 278 receives the PAN 270 from the point-of-sale instrument 268. In the case where the point-of-sale instrument 268 is a credit card or a bank card, the PAN 270 is located on a magnetic strip and the point-of-sale device 278 is a device that has a magnetic strip reader. In the example where the point-of-sale instrument 268 is an NFC device, the point-of-sale device 278 communicates with the point-of-sale instrument 268 through electromagnetic waves to receive the PAN 270.

The point-of-sale device 278 transmits a charge request 284 to the merchant acquirer computer system 280. The charge request 284 includes the PAN 270, the terminal number of the point-of-sale device 278. The point-of-sale computer system simultaneously transmits item identifiers for items A, B, C and D, and the price of each one of the items over the internet. Although not shown, the charge request 284 also includes a merchant account ID 130 to determine a merchant account 36 (FIG. 4A) to which the point-of-sale device 278 belongs to.

The merchant acquirer computer system 280 then transmits a charge request 286 to the issuer computer system 282. The charge request 286 includes the same data as the charge request 284. The point-of-sale network 26 has a number of different issuer computer systems 282 and the merchant acquirer 280 utilizes the IIN 272 to route the charge request 286 to the appropriate issuer computer system 282. The issuer computer system 282 then transmits a charge request 288 to the server computer system 12. The charge request 288 includes the same data as the charge request 286. The issuer computer system 282 utilizes the PAN 270 to route the charge request 288 to the server computer system 12.

Figure 9A:
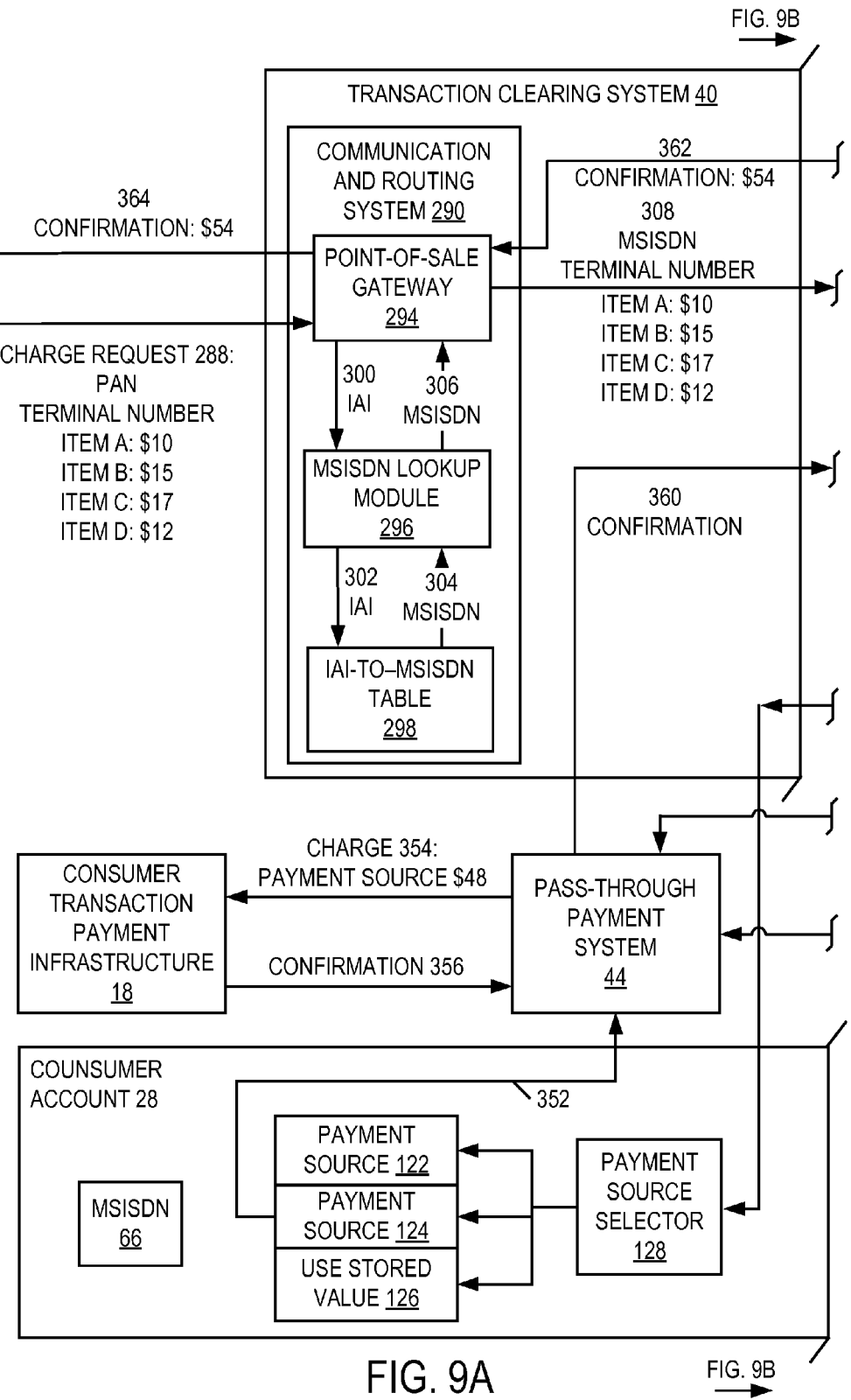
FIGS. 9A, B and C are a block diagram of a transactions clearing system for processing a charge request and providing confirmation back to a point-of-sale, a voucher clearing system to check for and apply vouchers as appropriate, and a pass-through payment system.

Referring to FIGS. 9A, B and C, the transaction clearing system 40 includes a communication and routing system 290 and a transaction processing system 292. The communication and routing system 290 communicates bidirectionally with the issuer computer system 282 (FIG. 8), communicates bidirectionally with the point-of-sale computer system 279 (FIG. 8) and communicates bidirectionally with the transaction processing system 292.

The communication and routing system 290 includes a point-of-sale gateway 294, an MSISDN lookup module 296 and an IAI-to-MSISDN table 298. The point-of-sale gateway 294 receives the charge request 288 from the issuer computer system 282 (FIG. 8) and receives the item identifiers for items A, B, C and D, and the price of each one of the items over the internet from the point-of-sale computer system 279. At 300, the point-of-sale gateway 294 provides the IAI 276 in the PAN 270 received in the charge request 288 to the MSISDN lookup module 296. At 302, the MSISDN lookup module 296 utilizes the IAI 276 as an input lookup into the IAI-to-MSISDN table 298. At 304, the MSISDN lookup module 296 receives a MSISDN from the IAI-to-MSISDN table 298. A plurality of IAIs are stored within the IAI-to-MSISDN table 298, each with a respective associated MSISDN. The MSISDN received at 304 corresponds to a specific IAI 276 provided at 302. At 306, the point-of-sale gateway 294 receives the MSISDN from the MSISDN lookup module 296. At 308, the point-of-sale gateway 294 provides a data set to the transaction processing system 292, including the MSISDN retrieved from the IAI-to-MSISDN table 298 via the MSISDN lookup module 296, the terminal number received in the charge request 288, the item identifiers and associated amounts received in the charge request 288, and the respective merchant account ID 130 received in the charge request 288.

The transaction processing system 292 includes an account lookup and debit module 310, a voucher application module 312, and a transaction validation or pass-through module 314.

The account lookup and debit module 310 receives the data set provided at 308 from the point-of-sale gateway 294. At 316, the account lookup and debit module 310 provides a data set to the voucher application module 312, including the terminal number, the item identifiers and their associated amounts. At 318, the voucher application module 312 provides a data set to the voucher management system 42 corresponding to the data set received from the account lookup and debit module 310 at 316.

Figure 10A:
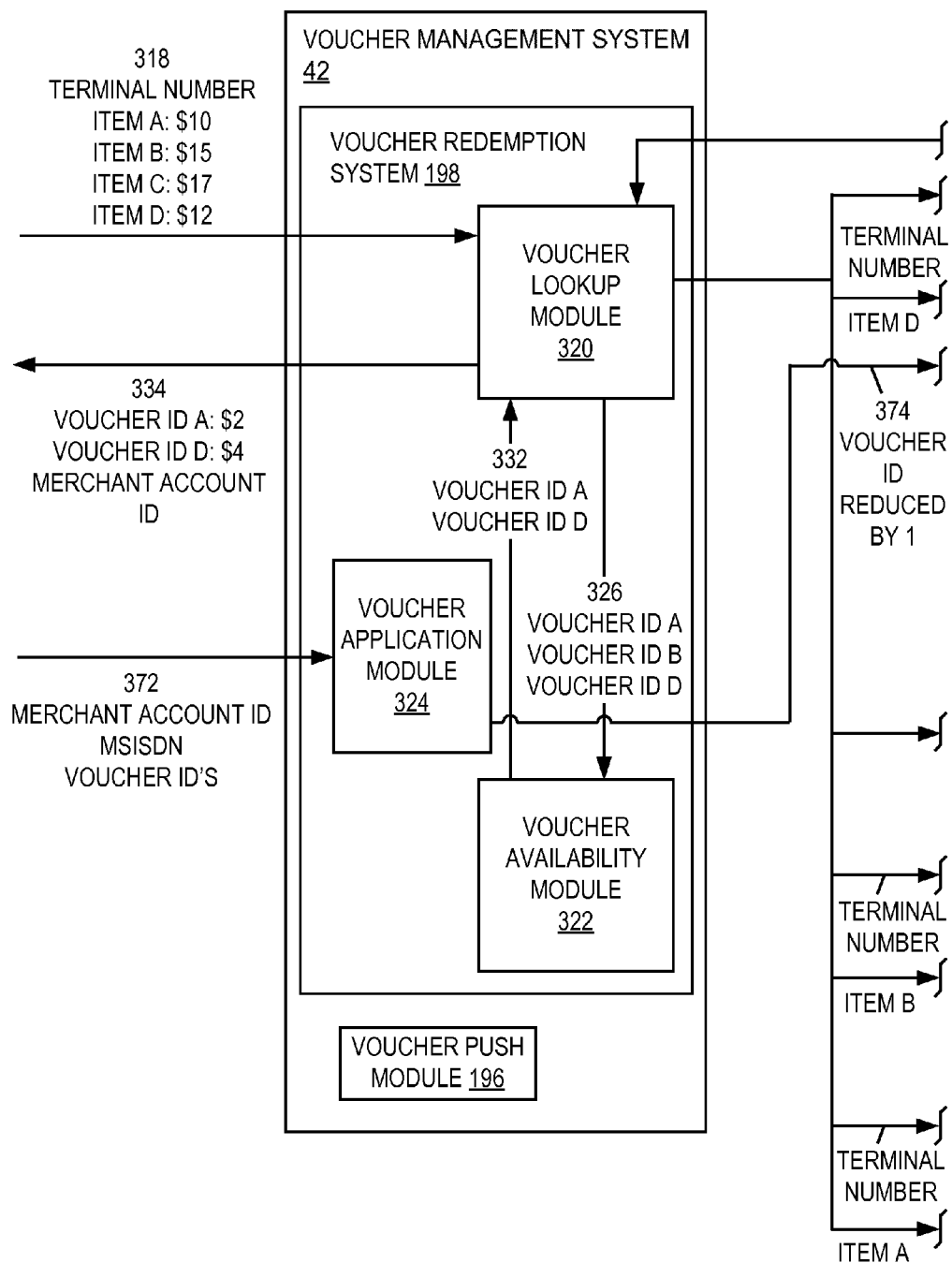
FIGS. 10A and B are a block diagram illustrating interaction between the voucher management system and the merchant account to check for and apply vouchers and to cancel them once they have been used.
Figure 10B:
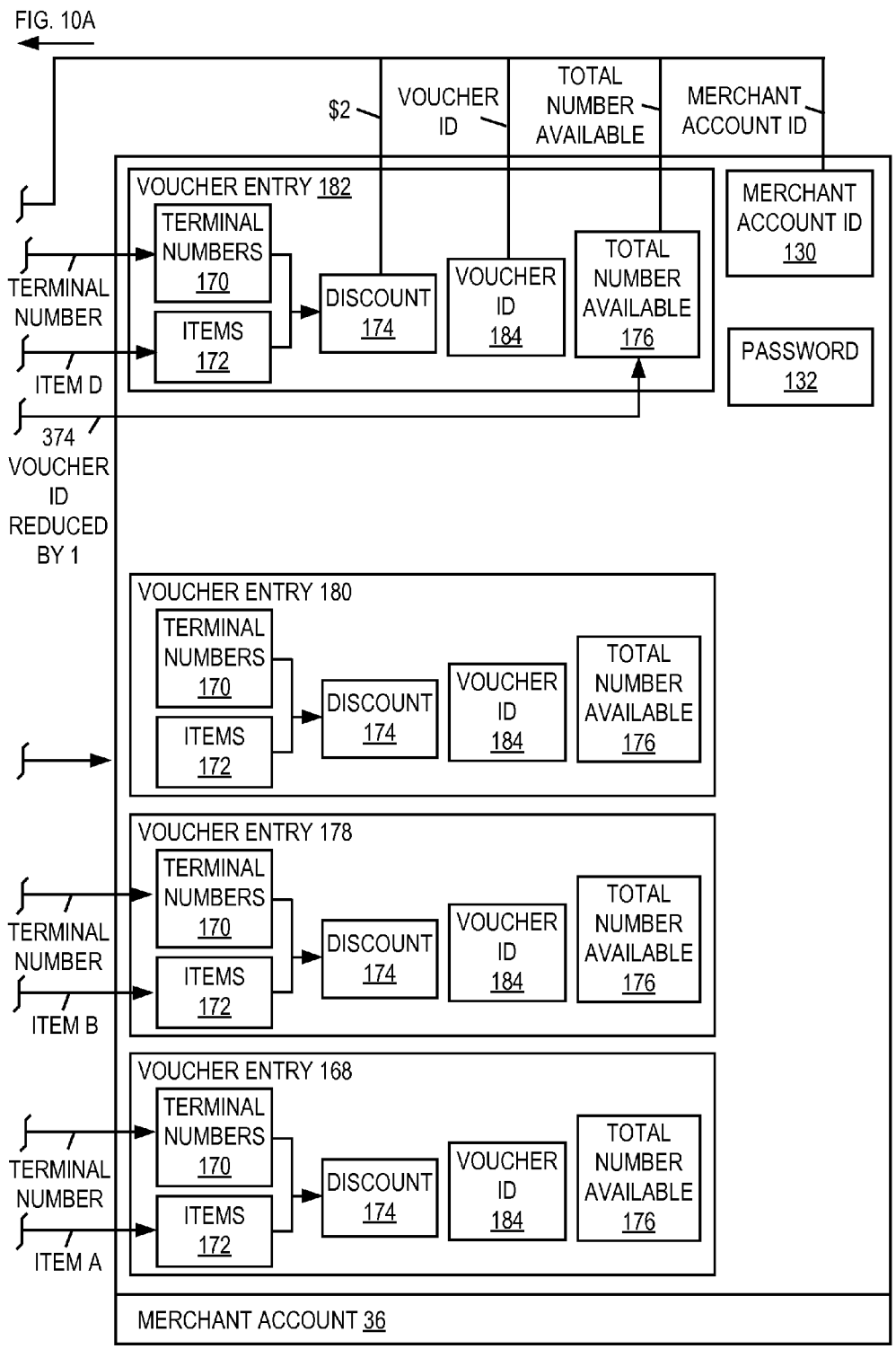

Reference is now made to FIGS. 10A and B. The purpose of the voucher application module 312 is to determine if, and if so, which voucher discounts may apply to the items identified in the data set received at 316. The voucher redemption system 198 includes a voucher lookup module 320, a voucher availability module 322 and a voucher application module 324.

The voucher lookup module 320 receives the data transmitted at 318 from the voucher application module 312. The voucher lookup module 320 then uses the data received at 318 to determine whether the data matches the data in the voucher entries 168, 178, 180 and 182. In each case, the terminal number received in the data 318 is used to determine which ones of the voucher entries 168, 178, 180 and 182 have matching terminal numbers 170. Each one of the item identifiers for items A, B, C and D is also used to determine whether they match any one of the items 172 in the voucher entries 168, 178, 180 and 182. Only if a respective voucher entry 168, 178, 180 or 182 has both a terminal number 170 and an item 172 matching the terminal number and one of the item identifiers in the data 318 is the respective discount 174 of the respective voucher entry 168, 178, 180 or 182 applied. In the present example, the voucher entry 168 has one of the terminal numbers 170 matching the terminal number received in the data 318 and has an item within the items 172 matching the item identifier for item A. Similarly, voucher entry 178 has both a matching terminal number and one of the items 172 matches one of the item identifiers, namely item B from the data 318. The voucher entry 182 also has a matching terminal number within the terminal numbers 170 and one of the items 172 matches the item identifier for item A in the data 318. The voucher 180 either does not have a matching terminal number within the terminal numbers 170 or the items 172 thereof do not match any one of the item identifiers for items A, B, C or D in the data 318. Only the discounts for voucher entries 168, 178 and 182 are now applied and the discount 174 of the voucher entry 180 is not applied.

The voucher lookup module 320 subsequently retrieves a set of data from the voucher entry 182, including the discount 174, in the present example $2, the voucher ID 184 and the total number available 176. Although not shown in the drawing, the voucher lookup module 320 also receives a similar set of data for the voucher entries 168 and 178. The voucher lookup module 320 then makes a determination whether the total number available 176 of the respective voucher entries 168, 178 or 182 is more than zero, in which case and only in that case, is the voucher entry still valid. The voucher lookup module 320 also retrieves the merchant account ID 130. For purposes of further discussion, the voucher ID's 184 of the voucher entries 168, 178 and 182 are all still valid and referred to herein as voucher ID's A, B and D.

Referring again to FIGS. 9A, B and C, the voucher lookup module at 320 submits the voucher ID's A, B and D to the voucher availability module 328. The voucher availability module 322 uses the voucher ID's A, B and D to determine which ones of the voucher ID's A, B and D are valid within the voucher ID's 204 of the respective consumer account 28. In the present example, the voucher ID B is not valid, either because it has previously been used or the particular consumer account 28 having the MSISDN 66 has not been targeted by a merchant. In the present example, voucher ID's A and D are found within the voucher ID's 204 and are determined as being valid. At 330, the voucher ID's A and D that are valid are returned to the voucher availability module 322 and at 332 the voucher lookup module 320 retrieves the voucher ID's A and D from the voucher availability module 322.

At 334 the voucher lookup module 320 submits the voucher ID's A and D together with their associated discounts, in the present example $2 and $4, in a data set to the voucher application module 312. The data set received at 334 by the voucher application module 312 also includes the respective merchant account ID 130 retrieved by the voucher lookup module 320. The voucher application module 312 then calculates a discounted amount based on the amounts of the items A to D minus the discounts found for items A and D. In the present example, the amount before the discount is $10+$15+$17+$12=$54 and the discounts total $2+$4=$6. The discounted amount is thus $54−$6=$48. At 336, the voucher application module 312 submits the voucher ID's A and D, the discounted amount of $48 and the respective merchant account ID 130 to the transaction validation or pass-through module 314.

At 338, the transaction validation or pass-through module 314 reads the payment source selector 128. If the payment source selector 128 points to the selector used stored value 126, then the transaction validation or pass-through module proceeds to 340, wherein the transaction validation or pass-through module 314 determines whether the discounted amount of $48 is less than the stored value 96. If the discounted amount of $48 is less than the stored value 96, then the transaction validation or pass-through module 314 validates the transaction to the account lookup and debit module 310. If the transaction validation or pass-through module 314 at 340 determines that the discounted amount of $48 is not less than the stored value 96, then the transaction validation or pass-through module 314 does not validate the transaction at 342 to the account lookup and debit module 310.

Only if the transaction is validated at 342 at the account lookup and debit module 310 does the account lookup and debit module 310 proceed at 344. At 344, the account lookup and debit module 310 utilizes the MSISDN received at 308 to identify the respective consumer account 28 having a MSISDN 66 matching the MSISDN received at 308.

The account lookup and debit module 310 then reduces the stored value 96 of the respective consumer account 28 having the respective MSISDN 66 by the discounted amount of $48. The consumer account 28 also has a set of previous transactions 346. At 348, the account lookup and debit module 310 records the respective transaction within the transactions 346. The account lookup and debit module 310 utilizes the respective MSISDN to retrieve the consumer account 28 having a matching MSISDN 66 and records the transaction including item identifiers for items A, B, C and D, a respective voucher ID associated with the respective item, and the respective discounted price of the respective item.

If at 338, the transaction validation or pass-through module 314 determines that the payment selector 128 is set to for example the payment source 124, then the transaction validation or pass-through module 314 does not proceed to 340, but instead proceeds to 350. At 350, the transaction validation or pass-through module 314 submits a charge request for $48 to the pass-through payment system 44 and receives confirmation from the pass-through payment system 44 as appropriate. At 352, the pass-through payment system 44 reads routing information from the payment source 124 to which the payment source selector 128 points. The pass-through payment system 44 then transmits a charge request 354 over a network such as the Internet to the consumer transaction payment infrastructure 18. The charge request 354 includes the routing information of the payment source and the discounted amount of $48. The consumer transaction payment infrastructure 18 then transmits a confirmation 356 that is received by the pass-through payment system 44. It may also be possible that the consumer transaction payment infrastructure 18 does not transmit the confirmation 356, in which case the transaction is denied. If the pass-through payment system 44 receives the confirmation 356, the pass-through payment system 44 proceeds to 348 wherein the transaction is recorded within the transactions 346 of the consumer account 28.

The stored value 96 is not charged in the latter scenario. By setting the payment source selector 128, the consumer is thus given the option to either charge the stored value 96, or to have the charge pass through the pass-through payment system 44 and have the charge of $48 be delivered to the consumer transaction payment infrastructure 18 instead of reducing the stored value 96. The payment source 122, 124 or the stored value 126 is selectable irrespective of the single PAN 270 used to create the charge request 284. Subsequent charge requests including the single PAN 270 result in processing of each subsequent charge request based on the payment source selector 128 until payment source selector 128 is changed to select another one of the payment sources 122, 124 or the stored value 126.

Following receipt of the confirmation 356, the pass-through payment system 44 at 360 provides a confirmation to the account lookup and debit module 310. Following either the validation received at 342 or the confirmation received at 360, the account lookup and debit module 310 at 362 submits a confirmation of a charge of the full undiscounted amount of $54 to the point-of-sale gateway 294. The point-of-sale gateway 294 at 364 transmits the confirmation of $54 to the issuer computer system 282 in FIG. 8. At 366, the issuer computer system 282 routes the confirmation of $54 to the merchant acquirer system 280. At 368, the merchant acquirer 280 routes the confirmation of $54 to the point-of-sale device 278. An operator of the point-of-sale device 278 will then know that the sale is good and will permit the consumer to leave the store with the items.

Referring again to FIGS. 9A, B and C, the account lookup and debit module 310 at 370 communicates with the transaction validation or pass-through module 314 to indicate that the transaction is complete. The transaction validation or pass-through module 314 responds to the communication at 370 to communicate at 372 with the voucher application module 324. The communication 374 includes the merchant account ID, the MSISDN and the voucher ID's that have been applied. Referring again to FIGS. 10A and B, at 374, the voucher application module 324 retrieves the voucher entry 182 having the voucher ID 184 corresponding to one of the voucher ID's received in the communication 372 and reduces the entry for total number available 176 by 1. The voucher application module 324 also reduces the total number available 176 of the voucher entry 168 by 1. The reduction of the total number available 176 effectively transfers one paid for discount out of the merchant account 36.

Referring again to FIGS. 9A, B and C, the voucher application module 324 proceeds at 376 to cancel the respective voucher ID's from the voucher ID's 204 in the consumer account 28. In one example, there may be only one voucher ID A among the voucher ID's 204 and only the single voucher ID A is cancelled. In another example, the voucher ID may have two or more numbers associated therewith, and only a single number is deducted from the numbers for voucher ID A, such that further numbers of the voucher ID are available until the number reaches zero.

Figure 9B:
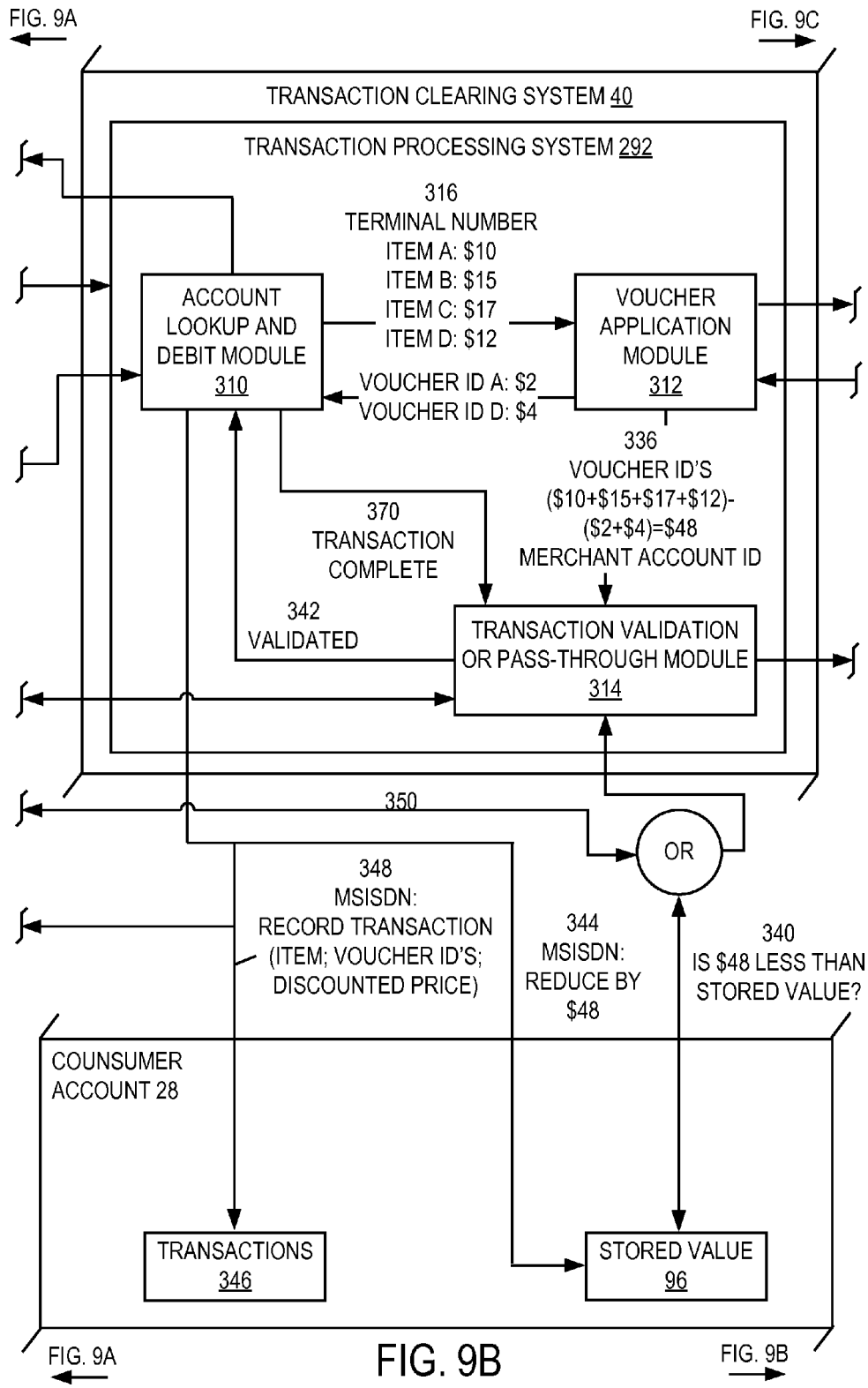
Figure 9C:
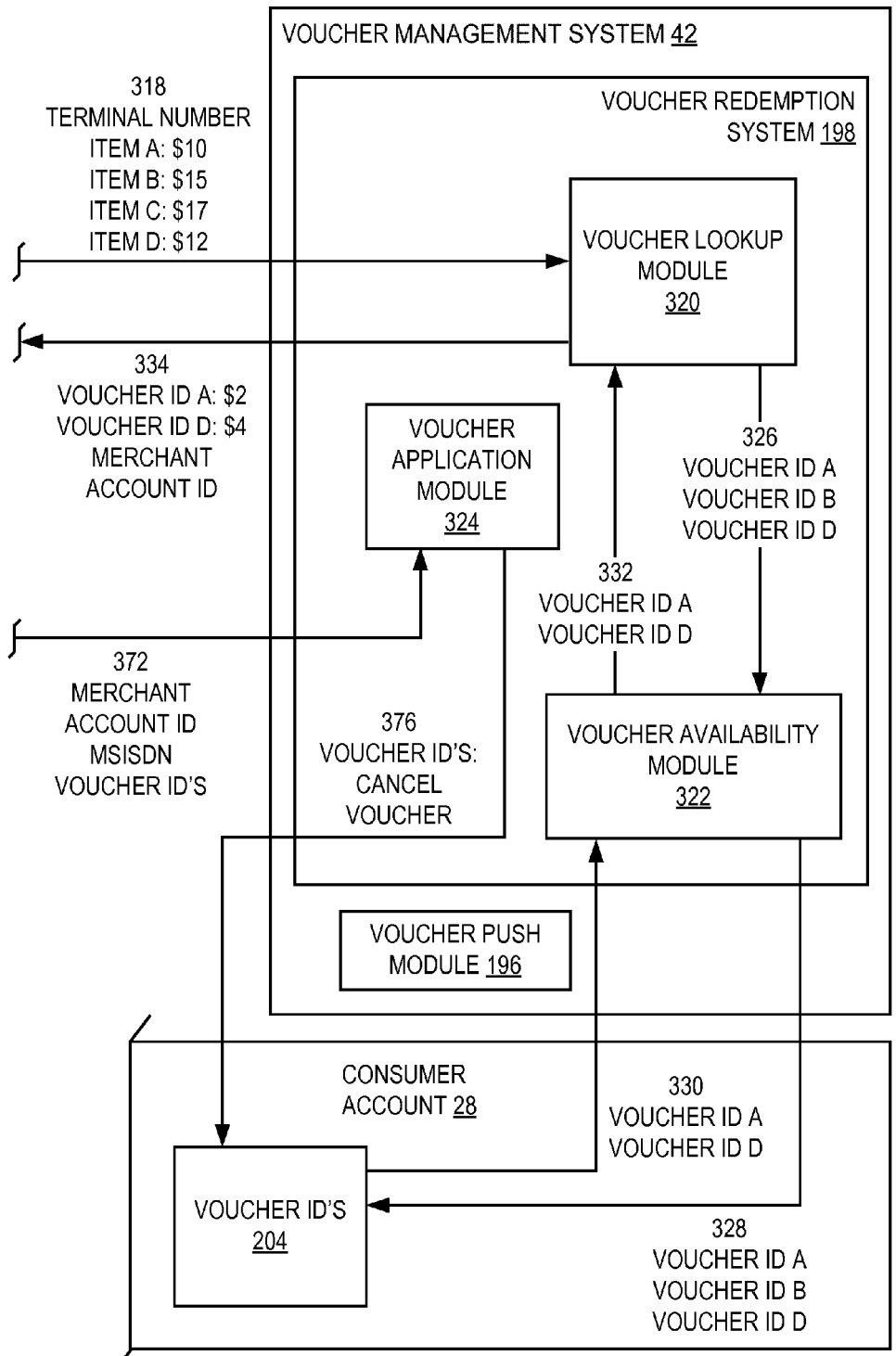
Figure 11:
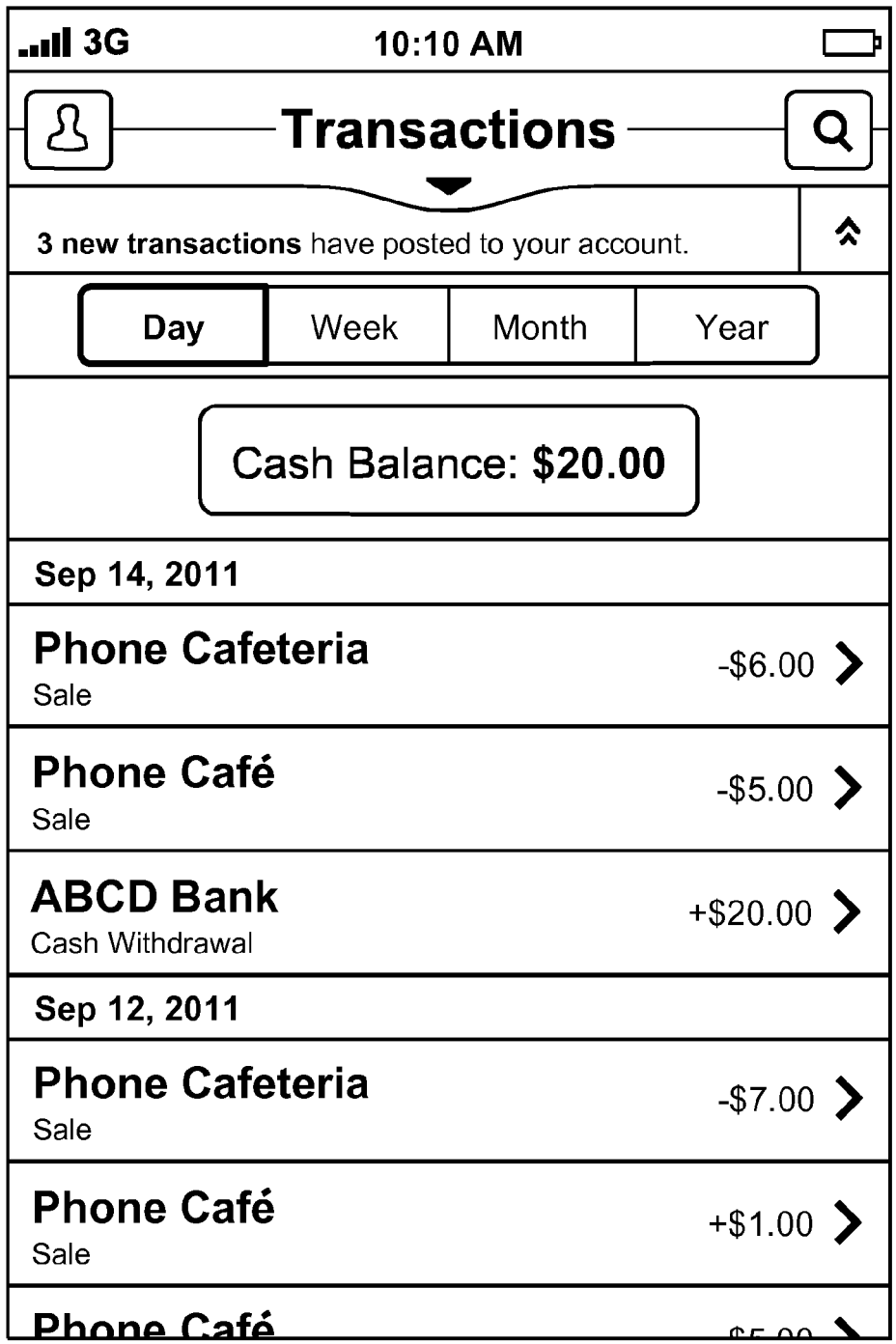
FIG. 11 is a view similar to FIG. 7K for a consumer to view transactions that have been recorded for the respective consumer account.

As mentioned, the transaction is recorded within the transactions 346. Referring again to FIG. 6A, the transactions viewing module 220 downloads the transactions 346 in FIG. 9B as transactions 380 and displays the transactions 380 as transactions 382 within the Interface 210. FIG. 11 is a view that is displayed within the Interface 210 in FIG. 6A where the consumer can view all transactions 382. The transactions include both purchases that have been made and credits that have been made to the stored value ("Cash Withdrawal").

FIG. 12 illustrates a view wherein the merchant can select sharing options for the offer that has been created as described with reference to FIGS. 5A to E. A field next to the title "Share With Others" permits the merchant to select whether the offer is either sharable ("Yes") or not sharable ("No"). The merchant offer is only transmitted if the merchant offer is sharable. Other limits that are selectable by the merchant include a total budget, the number of offers per user, the discount amount per offer, the share count, i.e. the total number of shared offers that are available, and the start and end dates of sharing of the offer, and are limits that are irrespective of any consumer account. One limit, namely shares per user, is specific to a consumer account.

Figure 13:
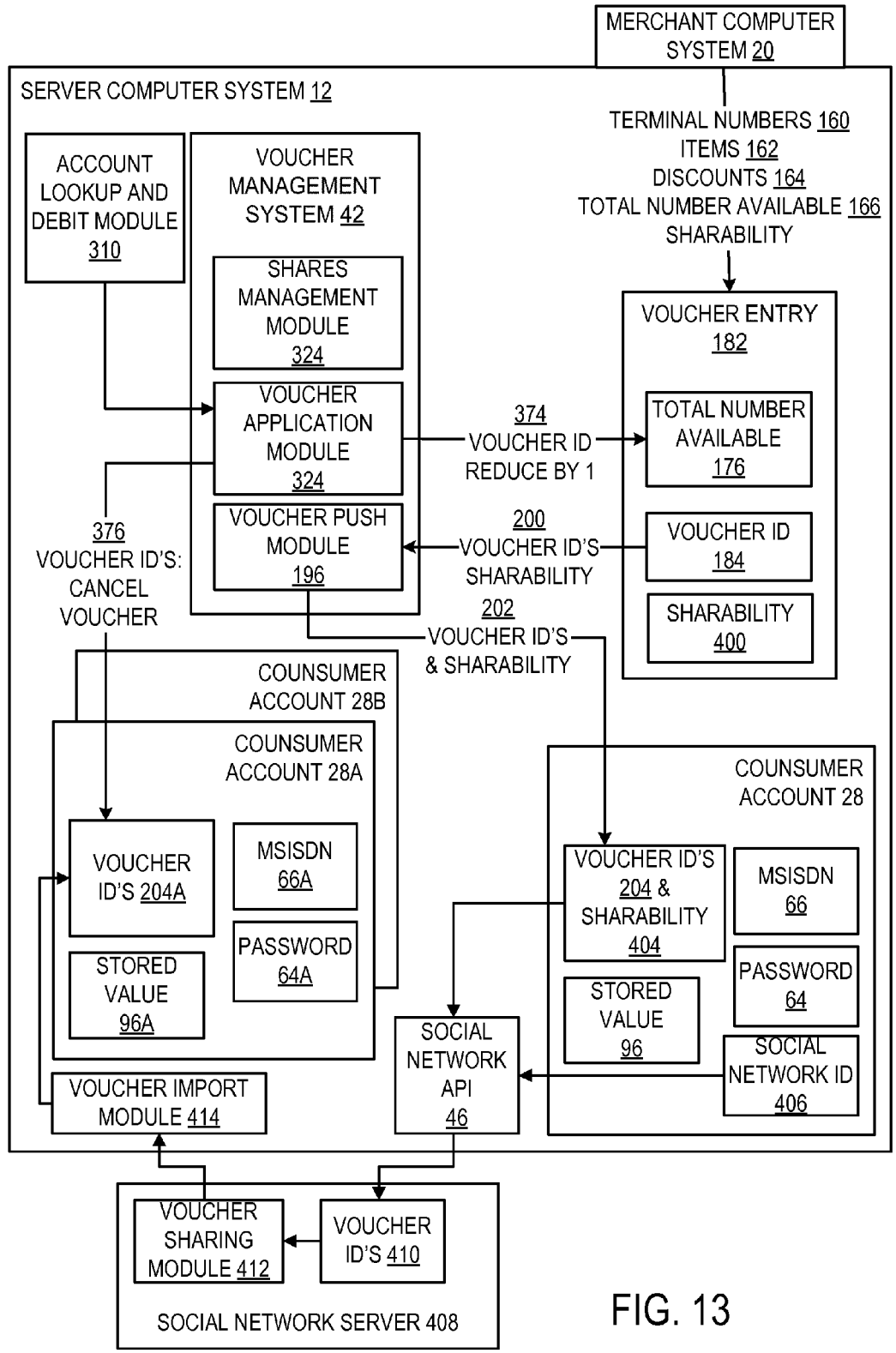
FIG. 13 is a block diagram illustrating sharing of an offer and redemption of the shared offer.

Reference is now made to FIG. 13 for illustrating sharing of an offer and redemption of a shared offer. The voucher entry 182 now includes a sharability 400 as set by the merchant as described with reference to FIG. 12. Although not shown, it will be understood that the other limits set in FIG. 12 are also included in the voucher entry 182.

At 200, the voucher push module 196 retrieves both the voucher ID 184 and its related sharability 400 from the voucher entry 182 and all other voucher entries. At 202, the voucher push module 196 places both the voucher ID's and their associated sharability within the consumer account 28. The consumer account 28 then has both the voucher ID's 204 and their associated sharability 404 therein, and therefore associated therewith. Using the consumer account management system 34 in FIGS. 2A and B, the consumer stores a social network ID 406 in the consumer account 28. The social network ID 406 identifies the consumer uniquely within a database of a social network server 408.

The social network API 46 is connected to the consumer account 28 to extract the social network ID 406 and enters the social network ID 406 within a data structure of the social network server 408 to identify a user within the social network server 408. The social network API 46 also determines which ones of the voucher ID'S 204 have a sharability that is selected to "Yes" for sharing of the respective voucher ID. The social network API 46 then transmits only the voucher ID's having a sharability selected to "Yes" to the social network server 408 and stores the voucher ID'S as voucher ID'S 410 within the social network server 408. Some of the voucher ID's 204 may for example have a sharability 404 set to "No" and are not transmitted by the social network API 46 to the social network server 408.

The social network server 408 has a voucher sharing module 412 that makes the voucher ID's 410 available for viewing and selection on a web page. Another consumer can select the voucher ID's 410. If the other consumer selects a voucher ID 410, the voucher sharing module 412 transmits the voucher ID 410 to the server computer system 12.

The server computer system 12 includes further consumer accounts 28A and B that are similar to the consumer account 28. The consumer account 28A has a respective password 64A, a respective MSISDN 66A and a respective stored value 96A. The consumer account 28B has similar components as the consumer account 28A. The server computer system 12 further includes a voucher import module 414 that receives the voucher ID's 410 from the voucher sharing module 412. The other consumer will then log into the consumer account 28A as hereinbefore described with reference to FIGS. 2A and B. If a consumer account does not exist for the particular consumer, then the consumer will be prompted to establish a consumer account as hereinbefore described with reference to FIGS. 2A and B. Once the consumer has logged into the consumer account 28A, the voucher ID 410 selected by the consumer on the web page of the social network server 408 is stored as a voucher ID 204A within the consumer account 28A. The consumer account 28A will then have the voucher ID 204A therein, whereas the consumer account 28B will not have a voucher ID such as a voucher ID 204A therein.

The consumer corresponding to the consumer account 28A may then make a purchase as hereinbefore described. When the account lookup and debit module 310 debits the stored value 96A of the consumer account 28A, the account lookup and debit module 310, at 374, causes the voucher application module 324 to reduce the total number available 176 by one, and at 376 to cancel the voucher ID 204A, as hereinbefore described.

Alternatively, the consumer corresponding to the consumer account 28 may make a purchase, in which case the voucher application module 324 will cancel the voucher ID 204 of the consumer account 28. In the case of either the consumer account 28 or 28A, the stored value 96 or 96A is reduced by the smaller amount after application of the respective discount of the voucher entry 182. By contrast, the consumer account 28B does not have a respective voucher ID and, should a consumer of the consumer account 28B make a purchase the stored value of the consumer account 28B will be reduced by the full purchase amount without application of the discount of the voucher entry 182.

During subsequent purchases, further shared vouchers may be redeemed that correspond to the voucher entry 182. The process can be continued until one of the limits for shared vouchers in FIG. 12 is reached.

Figure 14:
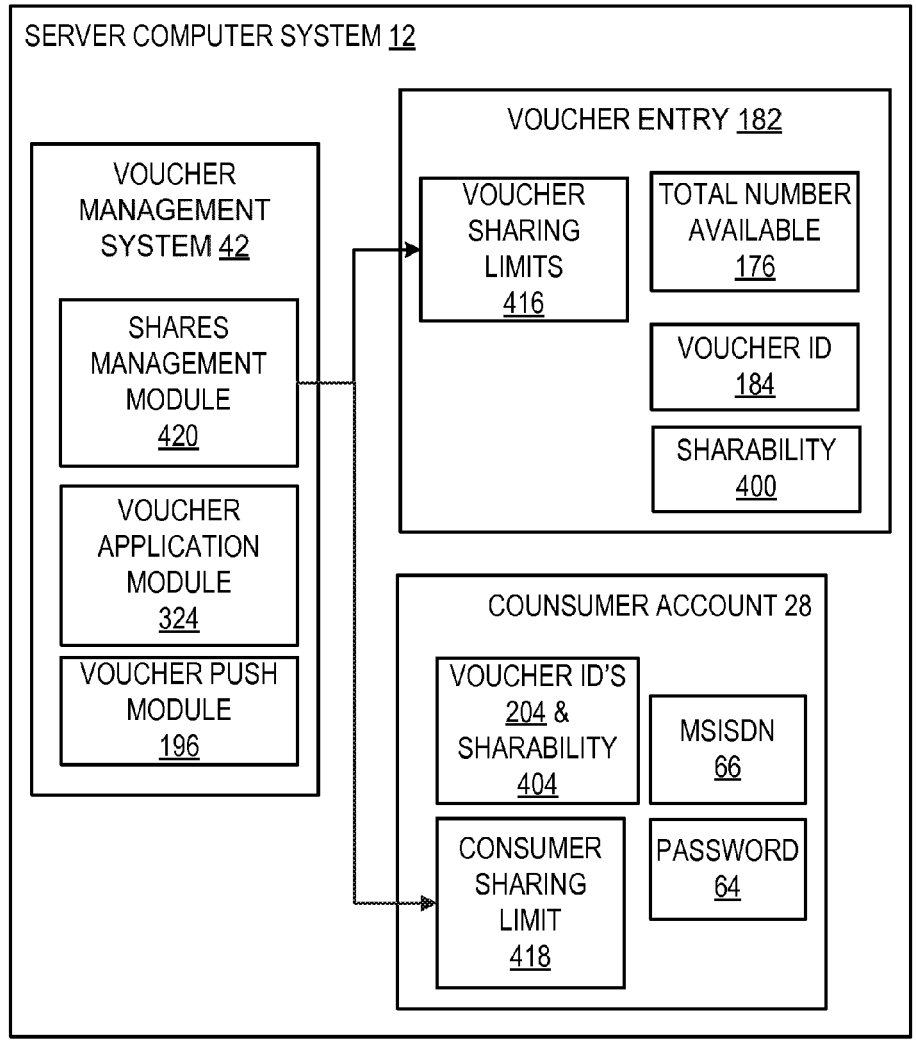
FIG. 14 is a block diagram illustrating functioning of a shares management module.

FIG. 14 shows voucher sharing limits 416 forming part of the voucher entry 182, a consumer sharing limit 418 forming part of the consumer account 28 and a shares management module 420 forming part of the voucher management system. The voucher sharing limits 416 are the limits set by the merchant in FIG. 12 that are irrespective of any consumer account. The consumer sharing limit 418 relates to both a particular voucher entry 182 and a particular consumer account and is the number that is selected by the merchant in FIG. 12 for shares per user following a redemption of the voucher by the voucher application module 324, the shares management module also decrements the voucher sharing limits 416 where applicable (e.g. for total number of shares) and decrements the consumer sharing limit 418 corresponding to the respective voucher entry 182.

The social network server 408 provides a convenient medium for sharing of the vouchers of the consumer account 28 with the consumer account 28A. In another embodiment, it may be possible to use another medium for sharing of an offer such as a text message or an email.

Voucher entries have been used by way of example to illustrate offers and the way that they are redeemed. In the examples described, the voucher entries correspond to item level discounts. In another embodiment, basket level discounts may be provided wherein a discount is given based on an entire purchase of a plurality of items as opposed to individual items of the purchase. It may also be possible that offers may be extended that are not redeemable at server level for any discounts, such as coupons that can be redeemed at a point of sale or advertisements.

Figure 15:
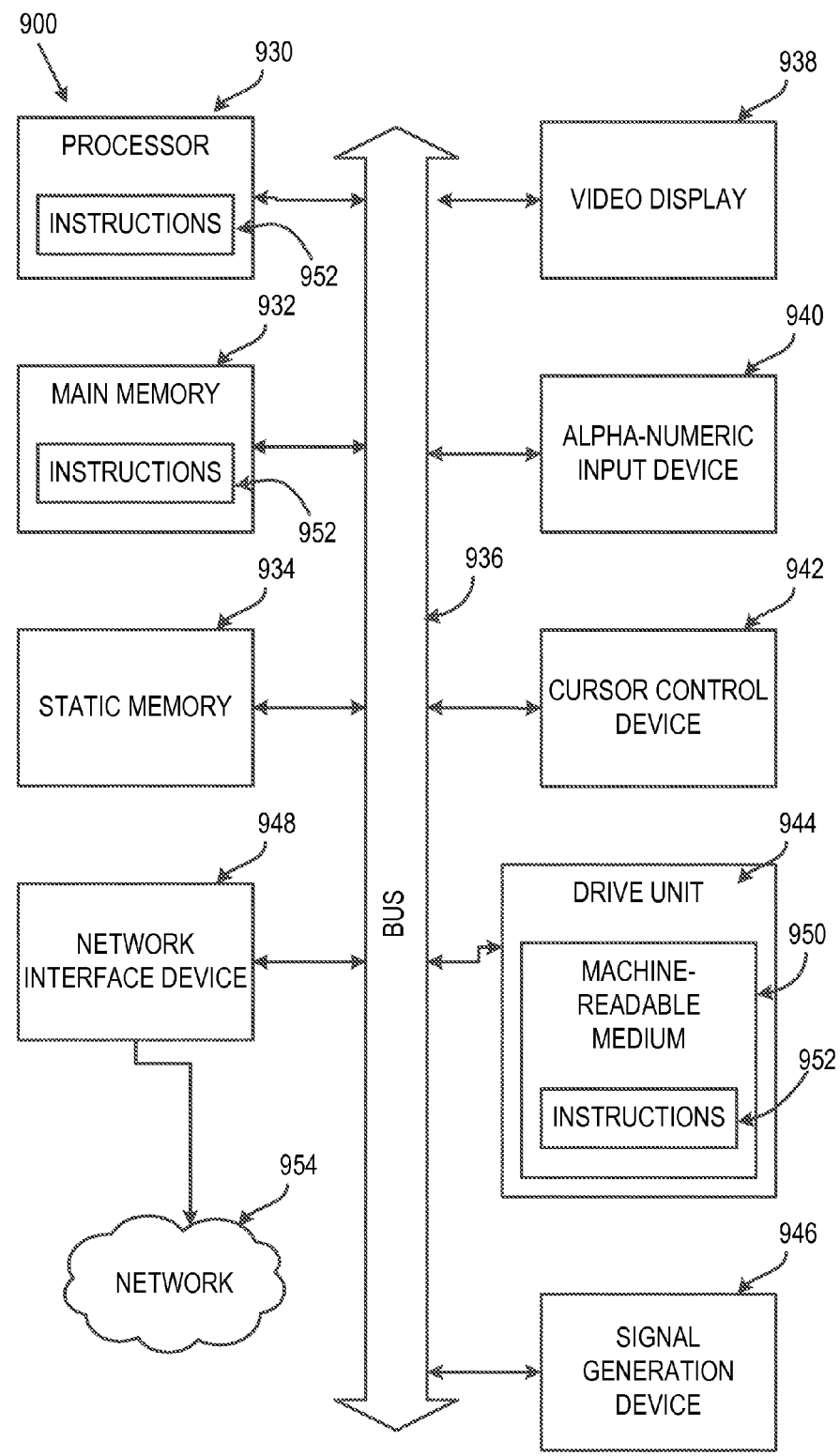
FIG. 15 is a block diagram of a machine in the form of a computer system forming part of the transactions network.

FIG. 15 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a network deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 930 (e.g., a central processing unit (CPU), a graphics processing unit (GPU), or both), a main memory 932 (e.g., read-only memory (ROM), flash memory, dynamic random access memory (DRAM) such as synchronous DRAM (SDRAM) or Rambus DRAM (RDRAM), etc.), and a static memory 934 (e.g., flash memory, static random access memory (SRAM, etc.), which communicate with each other via a bus 936.

The computer system 900 may further include a video display 938 (e.g., a liquid crystal display (LCD) or a cathode ray tube (CRT)). The computer system 900 also includes an alpha-numeric input device 940 (e.g., a keyboard), a cursor control device 942 (e.g., a mouse), a disk drive unit 944, a signal generation device 946 (e.g., a speaker), and a network interface device 948.

The disk drive unit 944 includes a machine-readable medium 950 on which is stored one or more sets of instructions 952 (e.g., software) embodying any one or more of the methodologies or functions described herein. The software may also reside, completely or at least partially, within the main memory 932 and/or within the processor 930 during execution thereof by the computer system 900, the memory 932 and the processor 930 also constituting machine readable media. The software may further be transmitted or received over a network 954 via the network interface device 948.

While the instructions 952 are shown in an exemplary embodiment to be on a single medium, the term "machine-readable medium" should be taken to understand a single medium or multiple media (e.g., a centralized or distributed database or data source and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories and optical and magnetic media.

Figure 16:
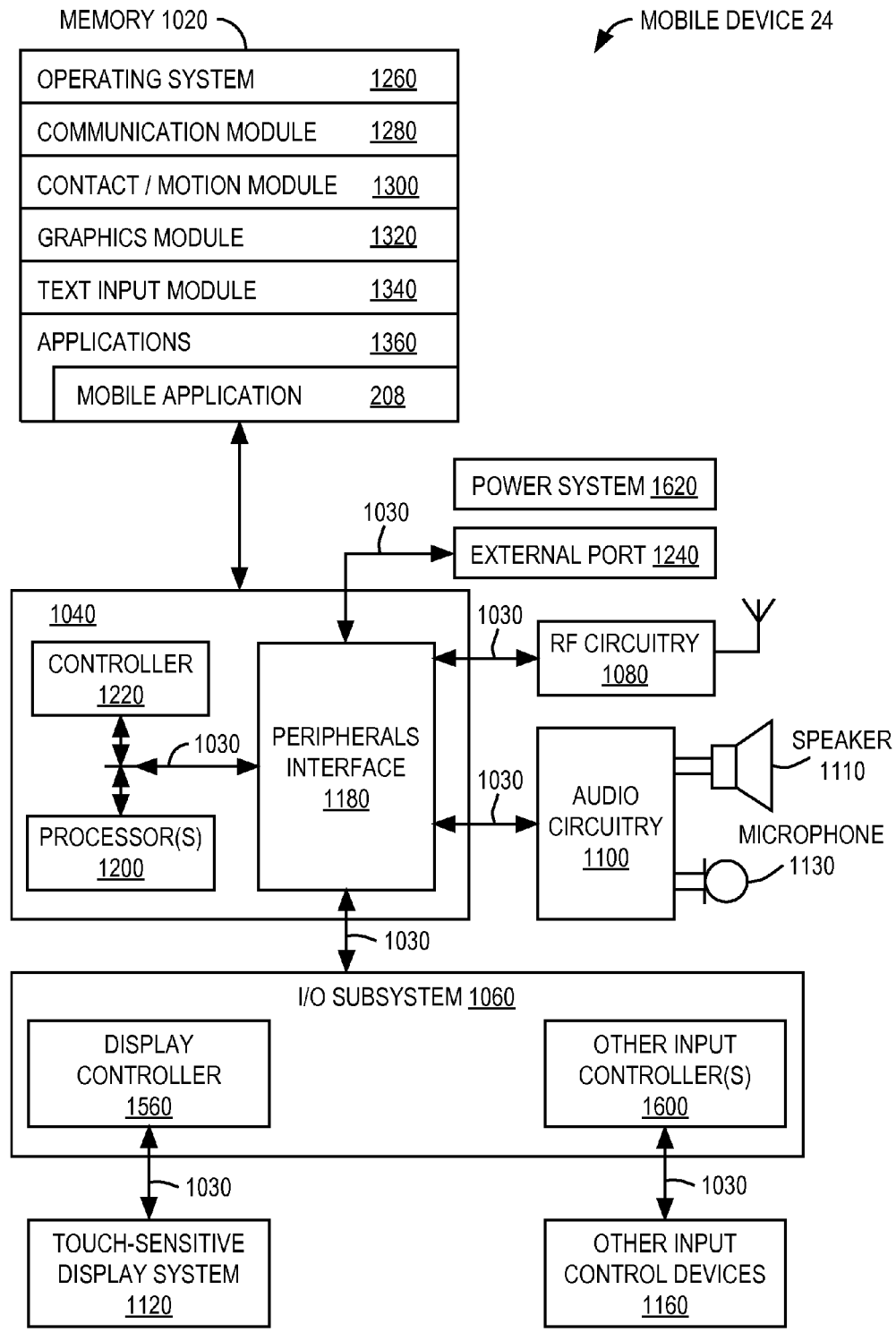
FIG. 16 is a block diagram of the mobile device illustrating SmartPhone features thereof.

FIG. 16 is a block diagram illustrating the mobile device 24, illustrating a touch-sensitive display 1120 or a "touch screen" for convenience. The mobile device 24 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 16 may be implemented in hardware, software or a combination of both hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the mobile device 24, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the mobile device 24 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the mobile device 24. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the mobile device 24, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the mobile device 24 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The mobile device 24 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the mobile application 208.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer system for managing electronic transactions, comprising:
   a server computer system including:
      a processor;
      a computer-readable medium connected to the processor;
      a network interface device connected to the processor; and
      a set of instructions on the computer-readable medium, the set of instructions being executable by the processor and including:
         a data store;
         a plurality of consumer accounts stored in the data store, each consumer account having a first consumer account identifier;
         a payment source storing module storing a plurality of payment sources associated with the respective consumer account having the respective consumer account identifier, wherein a first of the payment sources is a stored value in the consumer account and a second of the payment sources is a payment sources other than a stored value in the consumer account;

a payment source selector having a pointer set upon receiving a payment source selection over the network interface device to indicate a selected one of the payment sources, the payment source selector indicating a selected one of the payment sources based on the payment source selection;

a communication and routing module that, after the pointer is set to indicate a selected one of the payment sources, receives a charge request over the network interface device, the charge request including an amount and a second consumer account identifier and identifies a selected one of the consumer accounts by associating one of the first consumer account identifiers with the second consumer account identifier; and a transaction processing system that, in response to the communication and routing module receiving the charge request, determines the payment source selected with the pointer of the payment source selector and processes the charge request based on the payment source selected by the payment source selector, wherein the charge request is processed by reducing the stored value if the payment selector is set, prior to the communication and routing module receiving the charge request, to use the first payment source and the charge request is processed if the payment selector is set, prior to the communication and routing module receiving the charge request, to use the second payment source, by reading routing information from the second payment source and transmitting a charge request over the network interface device, the charge request transmitted by the transaction processing system including the routing information and an amount based on the amount in the charge request received by the communication and routing module.

2. The computer system of claim 1, wherein a single second consumer account identifier is usable to create the charge request and the payment source is selectable irrespective of the single second consumer account identifier.

3. The computer system of claim 2, further comprising:
a single payment instrument holding the single second consumer account identifier.

4. The computer system of claim 2, wherein subsequent charge requests including the single second consumer account identifier result in processing of each subsequent charge request based on the payment source selected by the payment source selector until the payment sources selector is changed to select another one of the payment sources with a pointer.

5. The computer system of claim 1, further comprising:
a mobile application storable on a mobile device and executable by the mobile device, the mobile application including a payment source selector module for making a payment source selection and transmission of the payment source selection to the network interface device to set the pointer.

6. The computer system of claim 1, wherein the set of instructions further includes: a funding module receiving a top-up instruction from a consumer account funding infrastructure, and increasing the stored value based on the top-up instruction.

7. The computer system of claim 1, wherein the transaction processing system includes: an account lookup and debit module that reduces the stored value based on the amount.

8. The computer system of claim 7, wherein the transaction processing system includes: a transaction validation module that compares the stored value with the amount, wherein the account lookup and debit module only reduces the stored value with the amount, wherein the stored value is (i) only reduced if the stored value is at least as much as the amount and (ii) not reduced if the stored value is less than the amount; and transmits a confirmation over the network interface device to (i) to accept the charge request only if the stored value is at least as much as the amount and (ii) to deny the charge request if the stored value is less than the amount.

9. The computer system of claim 1, wherein the first consumer account identifier is a first phone number and the second consumer account number is an individual account identifier forming at least part of a personal account number.

10. A computer-based method of managing electronic transactions comprising:
storing, with a processor, a plurality of consumer accounts in a data store, each consumer account having a first consumer account identifier;

storing, with the processor, a plurality of payment sources associated with the respective consumer account having the respective consumer account identifier, wherein a first of the payment sources is a stored value in the consumer account and a second of the payment sources is a payment sources other than a stored value in the consumer account;

receiving, with the processor, a payment source selection over the network interface device to indicate a selected one of the payment sources;

setting, with the processor, a pointer of a payment source selector to indicate a selected one of the payment sources based on the payment source selection;

receiving, with the processor, after the pointer is set to indicate a selected one of the payment sources, a charge request over the network interface device, the charge request including an amount and a second consumer account identifier;

identifying, with the processor, a selected one of the consumer accounts by associating one of the first consumer account identifiers with the second consumer account identifier;

determining, with the processor, in response to the communication and routing module receiving the charge request, the payment source selected with the pointer of the payment source selector; and processing, with the processor, the charge request based on the payment source selected by the payment source selector, wherein the charge request is processed by reducing the stored value if the payment selector is set, prior to the communication and routing module receiving the charge request, to use the first payment sourced the charge request is processed if the payment selector is set, prior to the communication and routing module receiving the charge request, to use the second payment source, by reading routing information from the second payment source and transmitting a charge request over the network interface device, the charge request transmitted by the transaction processing system including the routing information and an amount based on the amount in the charge request received by the communication and routing module.

11. The method of claim 10, wherein a single second consumer account identifier is usable to create the charge request and the payment source is selectable irrespective of the single second consumer account identifier.

12. The method of claim 11, wherein a single payment instrument holds the single second consumer account identifier.

13. The method of claim 11, wherein subsequent charge requests including the single second consumer account identifier result in processing of each subsequent charge request based on the payment source selected by the payment source selector until the payment sources selector is changed to select another one of the payment sources with the pointer.

14. The method of claim 10, wherein a mobile application on a mobile device is executable by the mobile device, the mobile application including a payment source selector module for making a payment source selection and transmission of the payment source selection to the network interface device to set the pointer.

15. The method of claim 10, further comprising: saving, with the processor, a stored value in the consumer account; receiving, with the processor, a top-up instruction from a consumer account funding infrastructure; and increasing, with the processor, the sored value based on the top-up instruction.

16. The method of claim 10, further comprising:
reducing, with the processor, the stored value based on the amount.

17. The method of claim 16, further comprising: comparing, with the processor, the stored value with the amount, wherein the stored value is (i) only reduced if the stored value is at least as much as the amount and (ii) not reduced if the stored value is less than the amount; and transmitting, with the processor, a confirmation over the network interface device to (i) to accept the charge request only if the stored value is at least as much as the amount and (ii) to deny the charge request if the stored value is less than the amount.

18. The method of claim 10, wherein the first consumer account identifier is a first phone number and the second consumer account number is an individual account identifier forming at least part of a personal account number.

* * * * *